United States Patent
Thompson et al.

(10) Patent No.: US 10,738,172 B2
(45) Date of Patent: Aug. 11, 2020

(54) DISPLAY PANEL ASSEMBLY AND METHODS OF MAKING SAME

(75) Inventors: David Scott Thompson, West Lakeland, MN (US); Robert S. Davidson, Bloomington, MN (US); David A. Berry, Ankeny, IA (US); Huang Chin Hung, Yonghe (TW); Audrey A. Sherman, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1550 days.

(21) Appl. No.: 13/516,400

(22) PCT Filed: Dec. 8, 2010

(86) PCT No.: PCT/US2010/059379
§ 371 (c)(1),
(2), (4) Date: Jun. 15, 2012

(87) PCT Pub. No.: WO2011/084315
PCT Pub. Date: Jul. 14, 2011

(65) Prior Publication Data
US 2012/0276354 A1     Nov. 1, 2012

Related U.S. Application Data

(60) Provisional application No. 61/287,243, filed on Dec. 17, 2009, provisional application No. 61/385,625, filed on Sep. 23, 2010.

(51) Int. Cl.
| C08J 5/12 | (2006.01) |
| G02B 1/04 | (2006.01) |
| B32B 7/022 | (2019.01) |

(52) U.S. Cl.
CPC ........... *C08J 5/128* (2013.01); *B32B 7/022* (2019.01); *G02B 1/04* (2013.01); *C09J 2201/28* (2013.01);
(Continued)

(58) Field of Classification Search
None
See application file for complete search history.

(56) References Cited

U.S. PATENT DOCUMENTS

| 2,823,218 A | 2/1958 | Speier |
| 3,220,972 A | 11/1965 | Lamoreaux |

(Continued)

FOREIGN PATENT DOCUMENTS

| EP | 0539099 | 4/1993 |
| EP | 1909138 | 4/2008 |

(Continued)

OTHER PUBLICATIONS

Colas, A. "Silicones: Preparation, Properties and Performance". Dow Corning, (2005); pp. 1-14.*

(Continued)

*Primary Examiner* — Prashant J Khatri
(74) *Attorney, Agent, or Firm* — Jeffrey M. Olofson

(57) ABSTRACT

A display panel assembly is made by optically bonding a display panel and a substantially transparent substrate. Optical bonding is carried out by forming a silicon-containing optical bonding layer having regions of different physical properties

3 Claims, 5 Drawing Sheets

(52) U.S. Cl.
CPC .... *C09J 2483/00* (2013.01); *Y10T 428/24983* (2015.01)

(56) References Cited

U.S. PATENT DOCUMENTS

| | | | |
|---|---|---|---|
| 3,419,593 | A | 12/1968 | Willing |
| 3,445,420 | A | 5/1969 | Kookootsedes |
| 3,715,334 | A | 2/1973 | Karstedt |
| 3,814,730 | A | 6/1974 | Karstedt |
| 3,933,880 | A | 1/1976 | Bergstrom |
| 3,989,666 | A | 11/1976 | Niemi |
| 3,989,667 | A | 11/1976 | Lee |
| 4,256,870 | A | 3/1981 | Eckberg |
| 4,347,346 | A | 8/1982 | Eckberg |
| 4,421,903 | A | 12/1983 | Ashby |
| 4,504,645 | A | 3/1985 | Melancon |
| 4,510,094 | A | 4/1985 | Drahnak |
| 4,511,620 | A * | 4/1985 | Kroupa et al. ............ 428/220 |
| 4,705,765 | A | 11/1987 | Lewis |
| 4,774,111 | A | 9/1988 | Lo |
| 4,916,169 | A | 4/1990 | Boardman |
| 5,088,502 | A | 2/1992 | Miller |
| 5,145,886 | A | 9/1992 | Oxman |
| 5,264,285 | A | 11/1993 | Dougherty |
| 5,523,168 | A | 6/1996 | Siol |
| 5,820,957 | A | 10/1998 | Schroeder |
| 5,867,241 | A | 2/1999 | Sampica |
| 5,998,096 | A | 12/1999 | Umemoto |
| 6,150,546 | A | 11/2000 | Butts |
| 6,376,569 | B1 | 4/2002 | Oxman |
| 6,388,724 | B1 | 5/2002 | Campbel |
| 6,562,175 | B1 * | 5/2003 | Lin et al. ............... 156/272.2 |
| 6,642,991 | B2 | 11/2003 | Krum |
| 6,770,685 | B1 | 8/2004 | Chang |
| 6,860,045 | B1 | 3/2005 | Sadler |
| 6,949,297 | B2 | 9/2005 | Yang |
| 7,192,795 | B2 | 3/2007 | Boardman |
| 7,255,920 | B2 | 8/2007 | Everaerts |
| 7,960,192 | B2 | 6/2011 | Thompson |
| 8,411,224 | B2 | 4/2013 | Takahashi |
| 2003/0236362 | A1 | 12/2003 | Bluem |
| 2004/0263481 | A1 | 12/2004 | Nishikawa |
| 2006/0029784 | A1 | 2/2006 | Doan |
| 2006/0105483 | A1 | 5/2006 | Leatherdale |
| 2006/0159867 | A1 | 7/2006 | O'Donnell |
| 2007/0141329 | A1 | 6/2007 | Yang |
| 2007/0141739 | A1 | 6/2007 | Thompson |
| 2007/0263160 | A1 | 11/2007 | Hsu |
| 2007/0267133 | A1 | 11/2007 | Matano |
| 2008/0007675 | A1 | 1/2008 | Sanelle |
| 2008/0011419 | A1 | 1/2008 | Everaerts |
| 2008/0079871 | A1 | 4/2008 | Hong |
| 2008/0138557 | A1 | 6/2008 | Everaerts |
| 2008/0280074 | A1 | 11/2008 | Sugino |
| 2008/0297685 | A1 | 12/2008 | Sugibayashi |
| 2009/0117378 | A1 | 5/2009 | Hu |
| 2009/0118440 | A1 | 5/2009 | Nakanishi |
| 2009/0183819 | A1 | 7/2009 | Matsuhira |
| 2010/0136265 | A1 | 6/2010 | Everaerts |
| 2011/0171400 | A1 | 7/2011 | Thompson |

FOREIGN PATENT DOCUMENTS

| | | |
|---|---|---|
| EP | 1959417 | 8/2008 |
| EP | 1995612 | 11/2008 |
| EP | 2133855 | 12/2009 |
| EP | 1973089 | 12/2010 |
| JP | 10-254380 | 9/1998 |
| JP | 2002-338833 | 11/2002 |
| JP | 2004-101636 | 4/2004 |
| JP | 2006-036865 | 2/2006 |
| JP | 2006-078929 | 3/2006 |
| JP | 2006-330301 | 12/2006 |
| JP | 2008-281997 | 11/2008 |
| JP | 2009-263401 | 11/2009 |
| JP | 2009-282364 | 12/2009 |
| WO | WO1997-008260 | 3/1997 |
| WO | WO1999-029795 | 6/1999 |
| WO | WO2000-075253 | 12/2000 |
| WO | WO2002-053602 | 7/2002 |
| WO | WO2005-021652 | 3/2005 |
| WO | WO2006-043794 | 4/2006 |
| WO | WO2006-132912 | 12/2006 |
| WO | WO2007-063751 | 6/2007 |
| WO | WO2008-128073 | 10/2008 |
| WO | WO2009-126532 | 10/2009 |
| WO | WO2009-137220 | 11/2009 |
| WO | WO2011-084315 | 7/2011 |

OTHER PUBLICATIONS

"Products: Optical Bonding"; General Digital: Optical Bonding Laboratories, 2002-2007, <http://www.gdoptilabs.com/products/optical_bonding.htm>, [retrieved from the internet Oct. 22, 2007].
Walker, G., "Optical bonding for improved LCD outdoor viewability", Aug. 2006, <http://www.ide-usa.com/optical%20bonding.pdf>, [retrieved from the internet Oct. 22, 2007].
News Bulletin, "VarTechVision"; Vartech Systems Inc., Oct. 2005, <http://www.vartechsystems.com/products/newsroom/october2005/October2005.asp> [retrieved from the internet on or about Jul. 13, 2009].
Sheppard, "Azo Compounds," *Encyclopedia of Polymer Science and Engineering*, vol. 2: Anionic Polymerization to Cationic Polymerization; Wiley-Interscience, New York; pp. 143-157 (1985).
Sheppard, "Peroxy compounds," *Encyclopedia of Polymer Science and Engineering*, vol. 11: Peroxy Compounds to Polyesters: Wiley-Interscience, New York, pp. 1-21 (1988).
Oda, et al., "Cage Effects in Nitrogen Radical Formation," *Makromol. Chem.*; vol. 179, Issue 9, pp. 2331-2336, (1978).
Sarac, "Redox polymerization," *Progress in Polymer Science*; vol. 24, Issue 8, pp. 1149-1204, (1999).
Odian, "Radical chain polymerization," *Principles of Polymerization*, 4th edition, John Wiley & Sons, Interscience, Hoboken, NJ, pp. 198-349, (2004).

* cited by examiner

DISPLAY PANEL ASSEMBLY AND METHODS OF MAKING SAME

CROSS REFERENCE TO RELATED APPLICATIONS

This application is a national stage filing under 35 U.S.C. 371 of PCT/US2010/059379, filed Dec. 8, 2010, which claims priority to U.S. Provisional Application Ser. No. 61/287243, filed Dec. 17, 2009, and U.S. Provisional Application Ser. No. 61/385625, filed Sep. 23, 2010, the disclosures of which is incorporated by reference in its/their entirety herein.

FIELD

This disclosure relates to components used in display devices, and particularly to assemblies having a display panel optically bonded to an optical substrate.

BACKGROUND

Optical bonding may be used to adhere together two optical elements using an optical grade optical bonding composition. In display applications, optical bonding may be used to adhere together optical elements such as display panels, glass plates, touch panels, diffusers, rigid compensators, heaters, and flexible films such as polarizers and retarders. The optical performance of a display can be improved by minimizing the number of internal reflecting surfaces, thus it may be desirable to remove or at least minimize the number of air gaps between optical elements in the display.

SUMMARY

A display panel assembly is disclosed herein. In some embodiments, the display panel assembly comprises: a display panel; a substantially transparent substrate; and an optical bonding layer disposed between the display panel and the substantially transparent optical substrate, the optical bonding layer comprising a first and second regions, each region having a different physical property. In some embodiments, the second region substantially surrounds the first region, and the hardness of the second region is greater than that of the first. In some embodiments, the optical bonding layer is formed from silicon-containing resins such as organosiloxanes.

In some embodiments, the display panel assembly comprises: a display panel; a substantially transparent substrate; and an optical bonding layer disposed between the display panel and the substantially transparent optical substrate, the optical bonding layer comprising a first region and a second region substantially surrounding the first region, wherein the second region comprises a second cured silicon-containing resin formed by hydrosilylation of a first silicon-containing resin comprising aliphatic unsaturation and a second silicon-containing resin comprising silicon-bonded hydrogen, and the hardness of the second region is greater than that of the first. The second cured silicon-containing resin may comprise an organosiloxane.

In some embodiments, the display panel assembly comprises: a display panel; a substantially transparent substrate; and an optical bonding layer disposed between the display panel and the substantially transparent optical substrate, the optical bonding layer comprising a first region and a second region substantially surrounding the first region, wherein the second region comprises a second cured silicon-containing resin formed by hydrosilylation of a first silicon-containing resin comprising aliphatic unsaturation and a second silicon-containing resin comprising silicon-bonded hydrogen, and the first region is tacky, and the second is not. The second cured silicon-containing resin may comprise an organosiloxane.

Disclosed herein are methods of optical bonding comprising: providing first and second optical substrates; providing a first composition comprising a first silicon-containing resin, the first silicon-containing resin comprising silicon-bonded hydrogen and aliphatic unsaturation present in a first molar ratio of from 0.01 to 2; providing a second composition comprising a second silicon-containing resin, the second silicon-containing resin comprising silicon-bonded hydrogen and aliphatic unsaturation present in a second molar ratio of from 2 to 100, wherein the first and/or second compositions comprise a metal catalyst; dispensing the first composition on a first major surface of the first optical substrate; dispensing the second composition on the first major surface; contacting a second major surface of the second optical substrate with the first and/or second compositions dispensed on the first major surface, such that a curable layer comprising the first and second compositions is formed between the first and second major surfaces; and curing the curable layer to form an optical bonding layer having first and second regions, wherein the hardness of the second region is greater than that of the first.

In some embodiments, the method comprises: providing first and second optical substrates; providing a first composition comprising a first silicon-containing resin, the first silicon-containing resin comprising silicon-bonded hydrogen and aliphatic unsaturation present in a first molar ratio of from 0.01 to 2; providing a second composition comprising a second silicon-containing resin, the second silicon-containing resin comprising silicon-bonded hydrogen and no aliphatic unsaturation, wherein the first and/or second compositions comprise a metal catalyst; dispensing the first composition on a first major surface of the first optical substrate; dispensing the second composition on the first major surface; contacting a second major surface of the second optical substrate with the first and/or second compositions dispensed on the first major surface, such that a curable layer comprising the first and second compositions is formed between the first and second major surfaces; and curing the curable layer to form an optical bonding layer having first and second regions, wherein the hardness of the second region is greater than that of the first.

In some embodiments, the method comprises: providing first and second optical substrates; providing a first composition comprising a first silicon-containing resin, the first silicon-containing resin comprising silicon-bonded hydrogen and aliphatic unsaturation present in a first molar ratio of from 0.01 to 2; providing a second composition comprising a second silicon-containing resin, the second silicon-containing resin comprising silicon-bonded hydrogen and aliphatic unsaturation present in a second molar ratio of from 2 to 100, wherein the first and/or second compositions comprise a metal catalyst; dispensing the first composition on a first major surface of the first optical substrate; dispensing the second composition on the first composition; contacting a second major surface of the second optical substrate with the first and/or second compositions dispensed on the first major surface, such that a curable layer comprising the first and second compositions is formed between the first and second major surfaces; and curing the curable layer to form an optical bonding layer having first and second regions, wherein the hardness of the second region is greater than that of the first.

In some embodiments, the method comprises: providing first and second optical substrates; providing a first composition comprising a first silicon-containing resin, the first silicon-containing resin comprising silicon-bonded hydrogen and aliphatic unsaturation present in a first molar ratio of from 0.01 to 2; providing a second composition comprising a second silicon-containing resin, the second silicon-containing resin comprising silicon-bonded hydrogen and no aliphatic unsaturation, wherein the first and/or second compositions comprise a metal catalyst; dispensing the first composition on a first major surface of the first optical substrate; dispensing the second composition on the first composition; contacting a second major surface of the second optical substrate with the first and/or second compositions dispensed on the first major surface, such that a curable layer comprising the first and second compositions is formed between the first and second major surfaces; and curing the curable layer to form an optical bonding layer having first and second regions, wherein the hardness of the second region is greater than that of the first.

In some embodiments, the method comprises: providing first and second optical substrates; providing a first composition comprising a first silicon-containing resin, the first silicon-containing resin comprising silicon-bonded hydrogen and aliphatic unsaturation present in a first molar ratio of 0.01 to 2, wherein the first composition comprises a metal catalyst; providing a second composition comprising a second silicon-containing resin, the second silicon-containing resin comprising aliphatic unsaturation and silicon-bonded hydrogen present in a second molar ratio of 2 to 100, wherein the second composition optionally comprises a metal catalyst; dispensing the first composition on a first major surface of the first optical substrate; contacting a second major surface of the second optical substrate with the first composition on the first major substrate such that a layer of the first composition is formed between the first and second major surfaces; forming a curable layer by applying the second composition between the first and second major surfaces after the layer of the first composition is formed; curing the curable layer to form an optical bonding layer having first and second regions, wherein the hardness of the second region is greater than that of the first.

In some embodiments, the method comprises: providing first and second optical substrates; providing a first composition comprising a first silicon-containing resin, the first silicon-containing resin comprising silicon-bonded hydrogen and aliphatic unsaturation present in a first molar ratio of 0.01 to 2, wherein the first composition comprises a metal catalyst; providing a second composition comprising a second silicon-containing resin, the second silicon-containing resin comprising silicon-bonded hydrogen and no aliphatic unsaturation, wherein the second composition optionally comprises a metal catalyst; dispensing the first composition on a first major surface of the first optical substrate; contacting a second major surface of the second optical substrate with the first composition on the first major substrate such that a layer of the first composition is formed between the first and second major surfaces; forming a curable layer by applying the second composition between the first and second major surfaces after the layer of the first composition is formed; curing the curable layer to form an optical bonding layer having first and second regions, wherein the hardness of the second region is greater than that of the first.

In some embodiments, the method comprises: providing first and second optical substrates; providing a first composition comprising a first silicon-containing resin, the first silicon-containing resin comprising silicon-bonded hydrogen and aliphatic unsaturation present in a first molar ratio of from 0.01 to 2; providing a second composition comprising a second silicon-containing resin, the second silicon-containing resin comprising silicon-bonded hydrogen and aliphatic unsaturation present in a second molar ratio of from 2 to 100, wherein the first and/or second compositions comprise a metal catalyst; dispensing the first composition on a first major surface of the first optical substrate; dispensing the second composition on a second major surface of the second substrate; bringing the first and second optical substrates in proximity to each other such that a curable layer comprising the first and second compositions is formed between the first and second major surfaces; and curing the curable layer to form an optical bonding layer having first and second regions, wherein the hardness of the second region is greater than that of the first.

In some embodiments, the method comprises: providing first and second optical substrates; providing a first composition comprising a first silicon-containing resin, the first silicon-containing resin comprising silicon-bonded hydrogen and aliphatic unsaturation present in a first molar ratio of from 0.01 to 2; providing a second composition comprising a second silicon-containing resin, the second silicon-containing resin comprising silicon-bonded hydrogen and no aliphatic unsaturation, wherein the first and/or second compositions comprise a metal catalyst; dispensing the first composition on a first major surface of the first optical substrate; dispensing the second composition on a second major surface of the second substrate; and bringing the first and second optical substrates in proximity to each other such that a curable layer comprising the first and second compositions is formed between the first and second major surfaces; and curing the curable layer to form an optical bonding layer having first and second regions, wherein the hardness of the second region is greater than that of the first.

BRIEF DESCRIPTION OF THE DRAWINGS

Advantages and features of the invention may be more completely understood by consideration of the following figures in connection with the detailed description provided below. The figures are schematic drawings and illustrations and are not necessarily drawn to scale.

FIG. 3b is a schematic cross-sectional view of an exemplary display panel assembly that may be made using the embodiment described in FIG. 3a.

DETAILED DESCRIPTION

Figure 1:
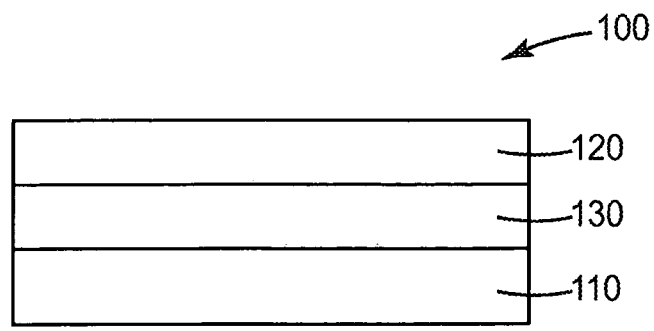
FIG. 1 is a schematic cross-sectional view of an exemplary display panel assembly.

This application is related to U.S. Provisional Application Ser. No. 61/287,243 (Thompson et al., filed Dec. 17, 2009); the disclosure of which are incorporated by reference herein for all that they contain.

Optical materials may be used to fill gaps between optical components or substrates of optical assemblies. Optical assemblies comprising a display panel bonded to an optical substrate may benefit if the gap between the two is filled with an optical material that matches or nearly matches the refractive indices of the panel and the substrate. For example, sunlight and ambient light reflection inherent between a display panel and an outer cover sheet may be reduced. Color gamut and contrast of the display panel can be improved under ambient conditions. Optical assemblies having a filled gap can also exhibit improved shock-resistance compared to the same assemblies having an air gap.

Many optical materials are not suitable for use in high performance applications such as high definition televisions. Many optical materials are susceptible to yellowing over time. Known optical materials may have low stress absorption causing bond failure during impact or thermal stress.

A display panel assembly having a large size or area can be difficult to manufacture, especially if efficiency and stringent optical quality are desired. A gap between optical components may be filled by pouring or injecting a curable composition into the gap followed by curing the composition to bond the components together. However, these commonly used compositions have long flow-out times which contribute to inefficient manufacturing methods for large optical assemblies. Some optical materials used to form optical bonding layers are difficult to work with during assembly resulting in defects when the optical bonding layer is formed. If there are any errors introduced during the fabrication of bonded displays, it can be difficult to rework any of the parts, resulting in yield loss and increased cost.

Optical materials used to fill gaps between optical components or substrates typically comprise adhesives and various types of cured polymeric compositions. However, these optical materials are not useful for making a display panel assembly if, at a later time, one wishes to disassemble or rework the assembly with little or no damage to the components. This reworkability feature is needed for optical assemblies because the components tend to be fragile and expensive. For example, a cover sheet often needs to be removed from a display panel if flaws are observed during or after assembly or if the cover sheet is damaged after sale. It is desirable to rework the assembly by removing the cover sheet from the display panel with little or no damage to the components. Reworkability of optical assemblies is becoming increasingly important in the display industry as larger and larger display panels are becoming available.

The optical assembly disclosed herein comprises two optical components or substrates, particularly a display panel and a substantially light transmissive substrate, bonded together with a novel type of optical bonding layer having regions of different properties. For example, the optical bonding layer may be soft and gel-like throughout most of the gap between the substrates, yet may be relatively harder and less tacky at or near the perimeter of one or both substrates. An optical bonding layer having these properties can provide superior adhesion and stress absorption because of the soft and gel-like material, yet be easily handled, exhibit little material transfer and little collection of dust because of the harder material at or near the perimeter of the assembly.

Methods of Optical Bonding

Referring to FIG. 1, there is shown a schematic cross sectional view of exemplary display panel assembly 100 comprising first optical substrate 110, second optical substrate 120, and optical bonding layer 130 disposed between the substrates. The first and second optical substrates are bonded together by optical bonding layer 130 such that, when display panel assembly 100 is moved, the substrates do not move substantially in relation to one another.

Figure 2A:
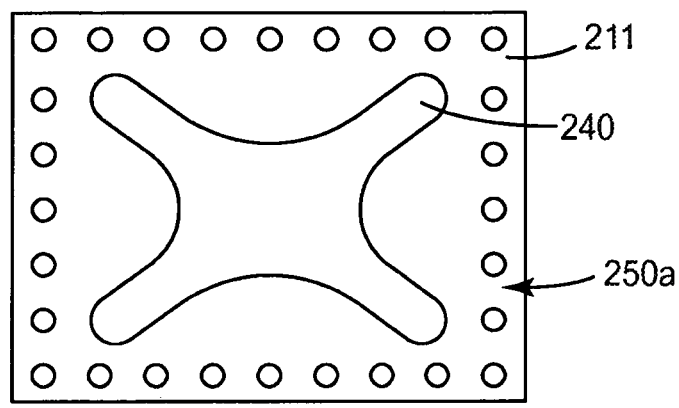
FIGS. 2a and 2b are schematic top-down views of embodiments in which first and second compositions are disposed on a first major surface of a first optical substrate.

FIG. 2a is a schematic top-down view of an embodiment in which first and second compositions, 240 and 250a respectively, are disposed on first major surface 211 of a first optical substrate. In this embodiment, the display panel assembly disclosed herein is prepared by dispensing first composition 240 onto first major surface 211 in an X-like shape as shown. Second composition 250a is dispensed as dots along the perimeter of first major surface 211.

Figure 2B:
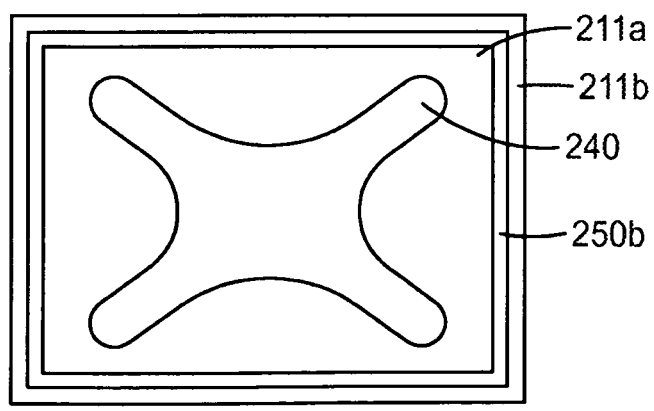

FIG. 2b is a schematic top-down view of an embodiment in which first and second compositions, 240 and 250b respectively, are disposed on first major surface 211 of a first optical substrate. The dots of second composition 250a are spread evenly with a brush or similarly effective tool to create band 250b which substantially surrounds first composition 240 as shown in FIG. 2b. Alternatively, the band of 250b may be formed directly by applying a line of the second composition using an appropriate application method, for example dispensing from a syringe. For the embodiment shown in FIG. 2b, first major surface 211 comprises two regions 211a and 211b.

The second optical substrate is slowly lowered down such that a second major surface of the second optical substrate contacts the first composition 240 and/or second compositions 250a and/or 250b such that a curable layer comprising the first and second compositions is formed between the first and second major surfaces. The first and/or second compositions spread out and mix together after contact with the second major surface as the first and second substrates are brought together. The curable layer of the resulting assembly (representative top down schematic shown in FIG. 4c) may then be cured using appropriate means, conditions, and processes as described below. An exemplary optical bonding layer prepared according to this method may have a gel-like, pressure sensitive adhesive-like or adhesive-like central region and a non-tacky perimeter region.

In general, "curable" is sometimes used to describe a composition, layer, region, etc. that cures under predetermined conditions such as application of heat, some type of radiation or energy, or by simply combining two reactive components at room temperature. As used herein, "curable" is used to describe (1) a composition, layer or region that is substantially uncured and becomes only partially cured or substantially completely cured; or (2) a composition, layer or region that is partially cured and partially uncured, and at least some amount of the uncured portion becomes cured; or (3) a composition, layer or region that is substantially uncured and becomes at least partially cured or substantially completely cured.

Figure 3A:
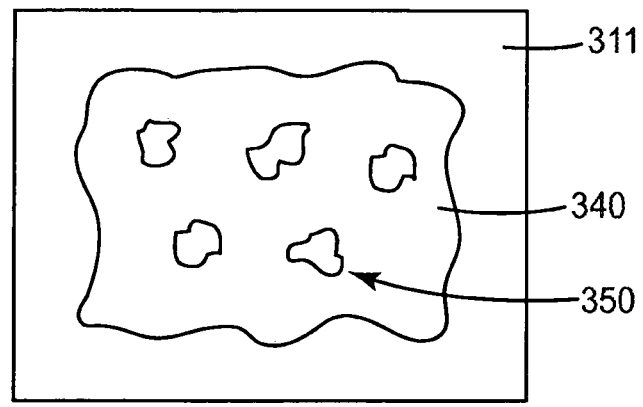
FIG. 3a is a schematic top-down view of an embodiment in which a second composition is disposed on a first composition that has been disposed on a first major surface of a first optical substrate.

FIG. 3a is a schematic top-down view of another embodiment in which first and second compositions, 340 and 350 respectively, are disposed on first major surface 311 of a first optical substrate. In this embodiment, the display panel assembly disclosed herein is prepared by dispensing first composition 340 onto first major surface 311 such that a large portion, such as a major portion, of the surface is covered. Second composition 350 is dispensed on first composition 340 as dots or spots. The second optical substrate is slowly lowered down such that a major surface of the substrate (the second major surface) contacts the first and/or second compositions dispensed on the first major surface, such that a curable layer comprising the first and second compositions is formed between the first and second major surfaces. The first and/or second compositions generally spread out upon contact with the second major surface, and the compositions mix to some extent depending on compatibility, viscosities, etc. of the compositions. The resulting assembly may then be cured using appropriate means, conditions, etc. as described below.

For FIGS. 3b, 3c, 4b, 4c, 5d-5f, optical bonding layers with dotted lines are shown. The dotted lines are intended to distinguish between different "regions" of the optical bonding layer. In some embodiments, the different regions form with little to no mixing of the first and second compositions. In some embodiments, the different regions form with considerable mixing of the first and second compositions, such that one or more additional regions are formed between the first and second regions. Regardless, the dotted lines are used to distinguish between regions having different properties. The dotted lines are not intended to limit the shape, size, length, etc. of any of the regions having different physical properties. In some embodiments, there may be one or more significant regions between the first and second regions, the one or more significant regions having a gradient of properties between that of the first and second regions. In some embodiments, the second composition by itself is not curable and only becomes curable when mixed with the first composition, such that the mixture of the first and second compositions forms a third composition, which upon curing, becomes one or more second regions of the optical bonding layer.

Figure 3B:
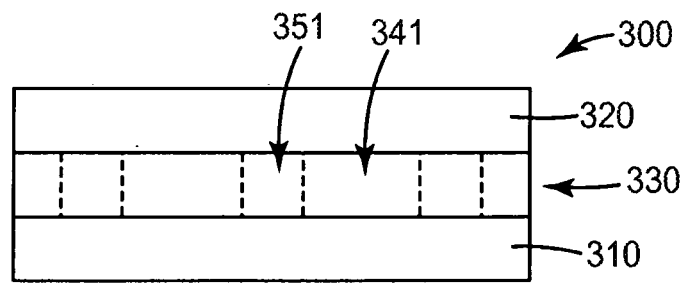
Figure 3C:
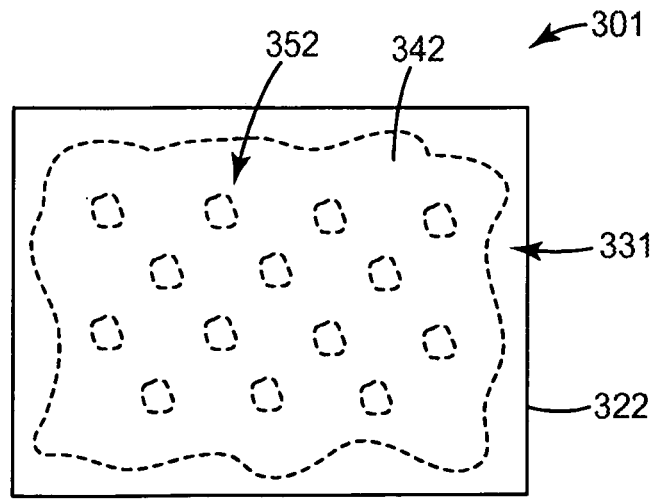
FIG. 3c is a schematic top-down view of the exemplary display panel assembly shown in FIG. 3b.

FIGS. 3b and 3c are schematic views of optical assemblies that may be made from the embodiment shown in FIG. 3a. In FIG. 3b, a schematic cross-sectional view of exemplary optical bonding layer 330, disposed between first major surface 311 of first optical substrate 310 and second major surface 321 of second optical substrate 320, is shown as having regions 341 and 351. In FIG. 3c, a schematic top-down view of exemplary display panel assembly 301 having optical bonding layer 331 disposed between first and second optical substrates; the view is a top-down view showing optical bonding layer 331 through a transparent second optical substrate having perimeter 322. Optical bonding layer 331 has region 342 and regions 352.

Another display panel assembly that may be made from the embodiment shown in FIG. 3a includes those in which the optical bonding layer formed between the first and second optical substrates extends to the perimeter of at least one of the substrates. In this case, the gap between the substrates is substantially filled with the first and second compositions. Yet another display panel assembly that may be made from the embodiment shown in FIG. 3a includes those in which the first and second compositions fill and subsequently overflow from the gap between the first and second optical substrates.

For the embodiment shown in FIG. 3a, a first composition that when cured becomes a tacky gel or tacky material such as a pressure sensitive adhesive, may be used in combination with a quick-curing second composition to anchor rapidly or spot tack two rigid optical substrates to one another. The purpose of the quick-curing second composition is to bond or join rapidly the two substrates together such that the display panel assembly may be handled and moved before the first composition is fully cured. Being able to at least quickly cure a portion of the optical bonding layer such that the display panel assembly may be moved can be very important for manufacturing productivity.

Figure 4A:
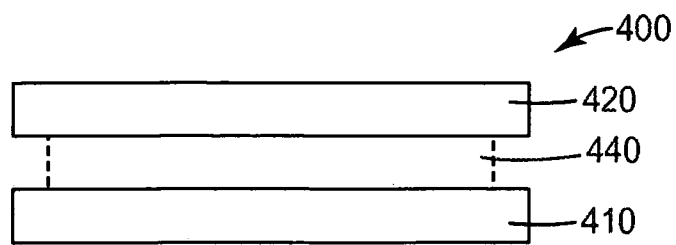
FIGS. 4a and 4b are schematic cross-sectional views showing another embodiment by which an display panel assembly disclosed herein may be made.
Figure 4B:
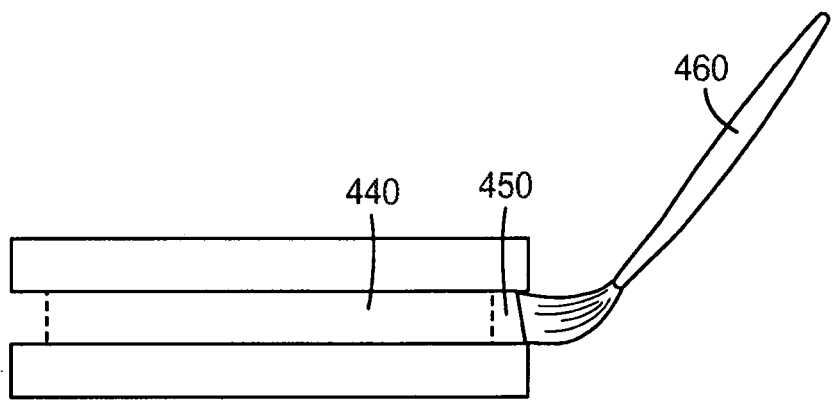

FIGS. 4a and 4b are schematic cross-sectional views showing another embodiment by which an display panel assembly disclosed herein may be made. Referring to FIG. 4a, assembly 400 is prepared by dispensing a first composition on first major surface 411 of first optical substrate 410, then curable layer 440 comprising the first composition is formed by contacting second major surface 421 of second optical substrate 420 with the composition. Subsequently, curable layer 440 may remain uncured or be only partially cured or substantially completely cured. As shown in FIG. 4b, second composition 450 is then dispensed using brush 460 or similar tool onto one or more edges of the assembly such that the second composition is disposed between the substrates. Curing may then be carried out to cure the first and/or second compositions thereby forming the optical bonding layer.

Regarding the embodiment shown in FIG. 4b, the second composition, before or after it is partially cured but still liquid, may contact the first composition which is uncured or only partially cured or substantially completely cured. Alternatively, the second composition, before or after it is cured, may not contact the first composition which is uncured or only partially cured or substantially completely cured. The first and second compositions may mix to some extent depending on, for example, the extent to which each is cured, the compatibility of the compositions, and the viscosities of the compositions.

Figure 4C:
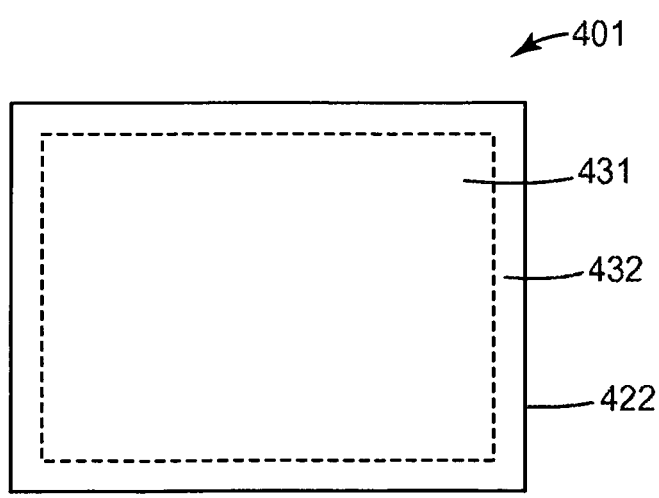
FIG. 4c is a schematic top-down view of an exemplary display panel assembly that may be made using the embodiments shown in FIGS. 2a, 2b, 4a and 4b.

FIG. 4c is a schematic top-down view of exemplary display panel assembly 401 that may be made as described for FIGS. 2a and 2b and FIGS. 4a and 4b. Display panel assembly 401 has an optical bonding layer (not identified by number) disposed between first and second optical substrates, 410 and 420, respectively. This top-down view shows the optical bonding layer through second optical substrate 420 which is transparent and has perimeter 422. The optical bonding layer has region 431 and region 432. In this embodiment, the optical bonding layer substantially fills the gap to the edges of the substrates, compared to the optical bonding layer shown in FIG. 3c which does not extend to the edges. In some embodiments, the first composition 440 shown in FIG. 4b extends to the edges of the first and second optical substrates and overflows slightly beyond the edges of the optical substrates. Two regions can be formed by the right choice of the second composition such that when brushed on the second composition infiltrates and mixes into the first composition and creates a second region in the optical bonding layer.

Figure 5A:
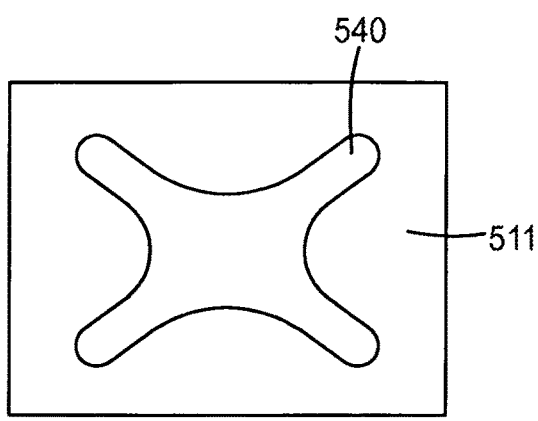
FIG. 5a is a schematic top-down view of an embodiment in which a first composition is disposed on a first major surface of a first optical substrate.
Figure 5B:
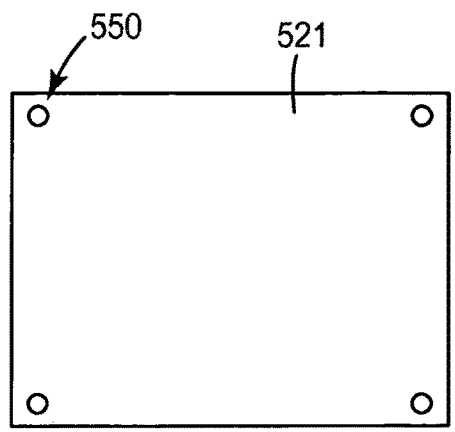
FIG. 5b is a schematic top-down view of an embodiment in which a second composition is disposed on a second major surface of a second optical substrate.
Figure 5C:
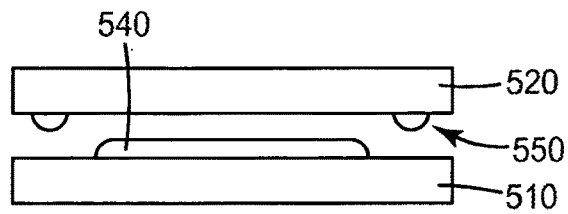
FIG. 5c is a schematic cross-sectional view of an exemplary method by which an exemplary display panel assembly may be made using the embodiments shown in FIGS. 5a and 5b.
Figure 5D:
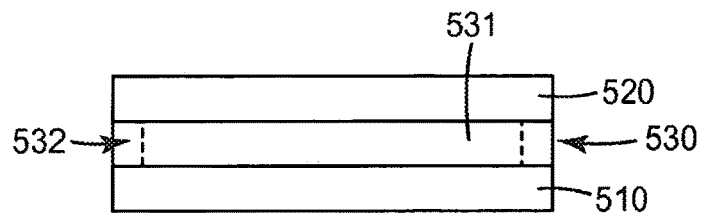
FIG. 5d is a schematic cross-sectional view of an exemplary display panel assembly formed from the embodiment shown in FIG. 5c.

FIGS. 5a-5d show schematic views of additional embodiments of the invention. FIG. 5a is a schematic top-down view in which first composition 540 is dispensed on first major surface 511 of first optical substrate 510, and FIG. 5b is a schematic top-down view in which second composition 550 is dispensed on second major surface 521 of second optical substrate 520 (arrow 550 in FIG. 5b refers to the four dots in the corners on second major surface 521). As shown in FIG. 5c, the two optical substrates with compositions are brought in proximity to one another, and subsequently, when the substrates are close enough, a curable layer comprising the first and second compositions is formed between first major surface 511 and the second major surface 521. FIG. 5d is a schematic cross-sectional view of exemplary display panel assembly 500 comprising optical bonding layer 530, prepared by at least partially curing the curable layer disposed between first major surface 511 and the second major surface 521. Optical bonding layer 530 has region 531 and regions 532.

Figure 5E:
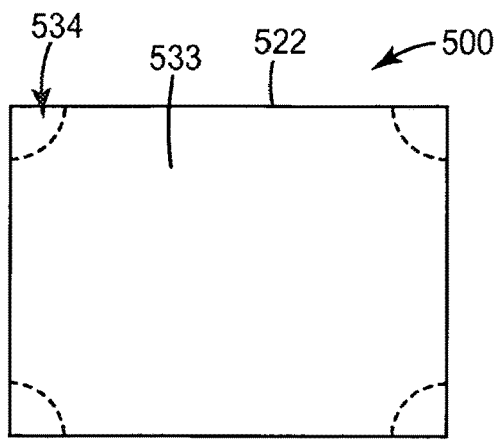
FIGS. 5e and 5f are schematic top-down views of exemplary optical assemblies formed from the embodiment shown in FIG. 5c.

FIG. 5e is a schematic top-down view of exemplary display panel assembly 501 that may be formed from the embodiment described for FIGS. 5a-c. Display panel assembly 501 has an optical bonding layer (not identified by number) disposed between first and second optical substrates, 510 and 520, respectively. This top-down view shows the optical bonding layer through second optical substrate 520 which is transparent and has perimeter 522. The optical bonding layer has region 533 and regions 534. The optical bonding layer substantially fills the gap between the first and second substrates, i.e., substantially to the edges. In some embodiments, the optical bonding layer may extend slightly beyond the edges of the two optical substrates.

Figure 5F:
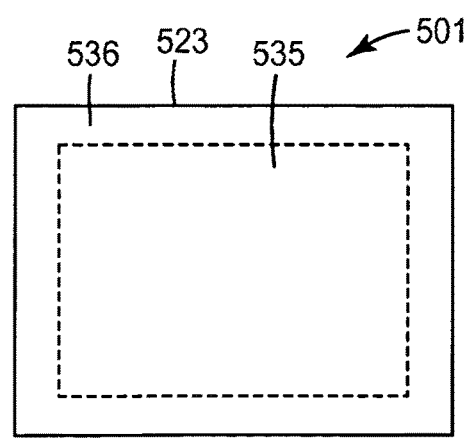

FIG. 5f shows an exemplary display panel assembly that may be formed from an embodiment similar to that shown for FIGS. 5a-c. Display panel assembly 502 has an optical bonding layer (not identified by number) disposed between first and second optical substrates, 510 and 520, respectively. This top-down view shows the optical bonding layer through second optical substrate 520 which is transparent and has perimeter 522. The optical bonding layer has regions 535 and 536, wherein region 536 substantially surrounds region 535. This type of optical bonding layer with regions 535 and 536 can be formed by forming a band of the second composition on the second major surface of the second substrate instead of the four dots in the corners as shown in FIG. 5b. The optical bonding layer substantially fills the gap between, i.e., to the edges, of the first and second substrates. In some embodiments, the optical bonding layer may extend slightly beyond the edges of the two optical substrates.

In general, the display panel assembly is made by bringing the second optical substrate in proximity to the first, and the "angle of approach" between the two substrates may be varied so that optimal formation of the optical bonding layer can occur. As shown in FIG. 5c, the two substrates may be brought in proximity to one another such that they are substantially parallel. This may be the case if first and/or second compositions are present on first and second optical substrates, respectively, as shown in FIG. 5c. Variations of the "parallel approach" may be employed, e.g., either or both of the first and second compositions may present on either or both substrates.

Figure 6A:
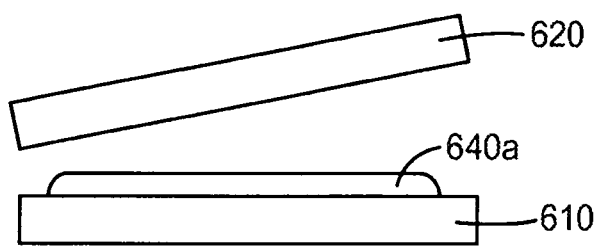
FIGS. 6a and 6b are schematic cross-sectional views showing how an exemplary display panel assembly may be made.
Figure 6B:
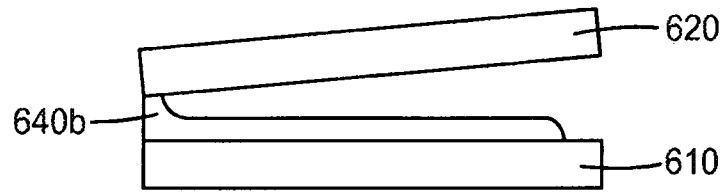

FIG. 6a shows a schematic cross-sectional view in which second optical substrate 620 is brought in proximity to first optical substrate 610 having first composition 640a disposed on first major surface 611. FIG. 6b shows a schematic cross-sectional view after second major surface 621 of second optical substrate 620 contacts first composition 640a which then wets the substrate as shown by 640b. As second optical substrate 620 becomes increasingly parallel to first optical substrate 610, first composition 640b continues to wet out second major surface 621 such that a layer of the first composition is formed between the two substrates. Variations of the "angled approach" may be employed, e.g., either or both of the first and second compositions may present on either or both substrates.

Optical Bonding Layer

In some embodiments, the optical bonding layer allows one to rework an optical assembly with little or no damage to components. The optical bonding layer can be used in optical assemblies comprising large display panels which may have an area of from about 15 $cm^2$ to about 5 $m^2$ or from about 15 $cm^2$ to about 1 $m^2$. For reworkability, the optical bonding layer may have a cleavage strength between glass substrates of about 15 N/mm or less, 10 N/mm or less, or 6 N/mm or less. Total energy to cleavage can be less than about 25 kg*mm over a 1"×1" area.

In some embodiments, the optical bonding layer exhibits little or no delamination under normal use or conditions specified by standards depending on the particular industry. Industry standards which may need to be met include accelerated aging tests, for example, elevated temperature storage at 65° C. or 85° C. for a period of time between 300 and 1000 hours, or heat and humidity storage, for example, at 65° C. and 95% relative humidity for a period of time between 300 and 1000 hours.

In some embodiments, the optical bonding layer is prepared using liquid compositions as the first and/or second compositions as described below. These types of liquid compositions have a viscosity suitable for efficient manufacturing of large optical assemblies. For example, the liquid composition may have a viscosity of from about 100 to about 140,000 cps, from about 100 to about 10,000 cps, from about 100 to about 5000 cps, from about 100 to about 1000 cps, from about 200 to about 700 cps, from about 200 to about 500 cps, or from about 500 to about 4000 cps wherein viscosity is measured for the composition at 25° C. and 1 $sec^{-1}$. The liquid compositions may have a viscosity of 18,000 cps to 140,000 cps for the composition at 25° C. and shear rate 1 $sec^{-1}$, and a viscosity of 700,000 cps to 4,200,000 cps for the composition at 25° C. and shear rate 0.01 $sec^{-1}$. The liquid compositions is amenable for use in a variety of manufacturing methods.

In some embodiments, the optical bonding layer comprises a second composition substantially surrounding the first, and the viscosity of the second composition is less than that of the first. For example, the viscosity of the second composition may be less than 10 times that of the first, or less than 5 times that of the first.

The optical bonding layer may have one or more regions which are soft, for example, a central region having a Shore A hardness of less than about 30, less than about 20 or less than about 10.

The optical bonding layer may exhibit little or no shrinkage, e.g., less than about 5%, depending on whatever amount is acceptable.

The optical bonding layer has optical properties suitable for the intended application. For example, the optical bonding layer may have at least 85% transmission over the range of from 460 to 720 nm. The optical bonding layer may have, per millimeter thickness, a transmission of greater than about 85% at 460 nm, greater than about 90% at 530 nm, and greater than about 90% at 670 nm. These transmission characteristics provide for uniform transmission of light across the visible region of the electromagnetic spectrum which is important to maintain the color point if the display panel assembly is used in full color displays.

The optical bonding layer preferably has a refractive index that matches or closely matches that of the first and/or second optical substrates, e.g., from about 1.4 to about 1.7. In some embodiments, the refractive indices of the first and second regions are substantially the same. In some embodiments, the refractive indices of the first and second regions are different by less than 0.5, 0.2, 0.1 or 0.01.

The optical bonding layer may have any suitable thickness. The particular thickness employed in the display panel assembly may be determined by any number of factors, for example, the design of an optical device in which the display panel assembly is used may require a certain gap between the display panel and the other optical substrate. The optical bonding layer typically has a thickness of from about 1 um to about 12 mm, from about 1 um to about 5 mm, from about 50 um to about 2 mm, from about 50 μm to about 1 mm, from about 50 um to about 0.5 mm, or from about 50 um to about 0.2 mm.

The first and/or second compositions used to make the optical bonding layer described herein may or may not be curable individually. At a minimum, the mixture of the first and second compositions must form a curable composition. When the curable layer between optical substrates is cured, an optical bonding layer is formed, the optical bonding layer having at least two regions with different physical properties.

Different physical properties of the optical bonding layer can comprise differences in the rates at which the cured regions are formed, differences in hardness of the two regions, differences in tack or level of adhesion between the two regions, and differences in moduli or elasticity. Differences in moduli may be defined as differences in the measured elastic modulus, Young' modulus, and storage and loss modulus between the regions. Further, one or both of the two regions may be in liquid form after curing, and if both are liquids, the viscosities may be different.

In some embodiments, the optical bonding layer comprises a first region and a second region substantially surrounding the first region, wherein the hardness of the second region is greater than that of the first. In some embodiments, the first and second regions are tacky. In some embodiments, the first region is tacky, and the second is not. In some embodiments, the optical bonding layer may be a gel or an elastomer, meaning that one or both regions may have these properties.

Nanoindentation is one useful way to measure differences in the properties of small and thin regions of the optical bonding layer. Nanoindentation can measure differences in the modulus of elasticity and hardness. Differences in tack or the tackiness of the at least two regions can be determined by qualitative means such as physical touching of a tissue to the two different regions and looking at the differences in the amount of fibers transferred to the region of the optical from the tissue. Differences in tack or tackiness of the at least two regions can be measured quantitatively using equipment such as a probe tack tester.

Any type of electromagnetic radiation may be used to cure the curable composition which forms the optical bonding layer. In some embodiments, the first and second compositions are formulated so that curing may be carried out by one or more curing means. Any one or combination of curing means may be used such as UV radiation (200-400 nm), actinic radiation (700 nm or less), near-IR radiation (700-1500 nm), heat, and/or electron beam. Actinic radiation is radiation that leads to the production of photochemical activity. For example, actinic radiation may comprise radiation of from about 250 to about 700 nm. Sources of actinic radiation include tungsten halogen lamps, xenon and mercury arc lamps, incandescent lamps, germicidal lamps, fluorescent lamps, lasers and light emitting diodes. UV-radiation can be supplied using a high intensity continuously emitting system such as those available from Fusion UV Systems.

In some embodiments, one or both of the optical substrates may have an opaque, colored or black border that may cover the second composition that is surrounding the first composition, for example, as shown in FIGS. 2b, 4c and 5f. In these cases, the border may block actinic radiation from reaching the covered region containing the second composition and may affect the ability to cure the second region. For such situations, alternative additives and/or catalysts may be required to cure the second composition, and/or a combination of curing means may be used. For example, if one or both optical substrates has an opaque, colored or black border that covers the second composition that is surrounding the first composition, actinic radiation may be used, followed by application of heat to cure any part of the curable layer not accessible by the actinic radiation because of the border.

In some embodiments, actinic radiation may be applied to the first and/or second compositions in order to partially polymerize the compositions. The first and/or second compositions may be disposed between the display panel and the substantially transparent substrate and then partially polymerized. The first and/or second compositions may be disposed on the display panel or the substantially transparent substrate and partially polymerized, then the other of the display panel and the substrate may be disposed on the partially polymerized layer.

In some embodiments, actinic radiation may be applied to a layer of the first and/or second compositions in order to completely or nearly completely polymerize the compositions. The first and/or second compositions may be disposed between the display panel and the substantially transparent substrate and then completely or nearly completely polymerized. The first and/or second compositions may be disposed on the display panel or the substantially transparent substrate and completely or nearly completely polymerized, then the other of the display panel and the substrate may be disposed on the polymerized layer.

The optical bonding layer is formed from first and second compositions, and either or both of these compositions can comprise a silicon-containing resin having silicon-bonded hydrogen and aliphatic unsaturation. A silicon-containing resin is referred to as a "first" silicon-containing resin if the resin is present in the first composition. Likewise, a silicon-containing resin is referred to as a "second" silicon-containing resin if the resin is present in the second composition. A description of a silicon-containing resin can apply to both first and second silicon-containing compositions if first or second is not specified in the description.

In general, a silicon-containing resin undergoes metal-catalyzed hydrosilylation reactions between groups incorporating aliphatic unsaturation and silicon-bonded hydrogen. The silicon-containing resin can include monomers, oligomers, polymers, or mixtures thereof. It includes silicon-bonded hydrogen and aliphatic unsaturation, which allows for hydrosilylation (i.e., the addition of a silicon-bonded hydrogen across a carbon-carbon double bond or triple bond). The silicon-bonded hydrogen and the aliphatic unsaturation may or may not be present in the same molecule. Furthermore, the aliphatic unsaturation may or may not be directly bonded to silicon. In some embodiments, the display panel assembly comprises: a display panel; a substantially transparent substrate; and an optical bonding layer disposed between the display panel and the substantially transparent optical substrate, the optical bonding layer comprising a first region and a second region substantially surrounding the first region, wherein the second region comprises a second cured silicon-containing resin comprising chemical fragment —Si($X^1$)($X^2$)—$CH_2$-$CH_2$— wherein $X^1$ and $X^2$ independently comprise an aliphatic group free of aliphatic unsaturation, and the hardness of the second region is greater than that of the first. The chemical fragment may comprise —O—Si($X^1$)($X^2$)—$CH_2$-$CH_2$—Si($X^3$)($X^4$)—O—, wherein $X^1$, $X^2$, $X^3$ and $X^4$ independently comprise an aliphatic group free of aliphatic unsaturation.

In some embodiments, the display panel assembly comprises: a display panel; a substantially transparent substrate; and an optical bonding layer disposed between the display panel and the substantially transparent optical substrate, the optical bonding layer comprising a first region and a second region substantially surrounding the first region, wherein the second region comprises a second cured silicon-containing resin comprising chemical fragment —Si($X^1$)($X^2$)—$CH_2$-$CH_2$— wherein $X^1$ and $X^2$ independently comprise an aliphatic group free of aliphatic unsaturation, and the first region is tacky, and the second is not. The chemical fragment may comprise —O—Si($X^1$)($X^2$)—$CH_2$-$CH_2$—Si($X^3$)($X^4$)—O— wherein $X^1$, $X^2$, $X^3$ and $X^4$ independently comprise an aliphatic group free of aliphatic unsaturation.

The silicone-containing resins undergo metal-catalyzed hydrosilylation to form one or more cured silicone-containing resins in the optical bonding layer. A cured silicone-containing resin comprises chemical fragment —Si($X^1$)($X^2$)—$CH_2$-$CH_2$— wherein $X^1$ and $X^2$ independently comprise an aliphatic group free of aliphatic unsaturation. This chemical fragment forms from the addition of a silicon-bonded hydrogen across a carbon-carbon double bond.

In some embodiments, each $X^1$ and $X^2$ can independently comprise a monovalent, straight-chained, branched or cyclic, unsubstituted or substituted hydrocarbon group that is free of aliphatic unsaturation and has from 1 to 18 carbon atoms. Examples of suitable $X^1$ and $X^2$ groups are alkyl groups such as methyl, ethyl, n-propyl, iso-propyl, n-butyl, iso-butyl, tert-butyl, n-pentyl, iso-pentyl, neo-pentyl, tert-pentyl, cyclopentyl, n-hexyl, cyclohexyl, n-octyl, 2,2,4-trimethylpentyl, n-decyl, n-dodecyl, and n-octadecyl; aromatic groups such as phenyl or naphthyl; alkaryl groups such as 4-tolyl; aralkyl groups such as benzyl, 1-phenylethyl, and 2-phenylethyl; and substituted alkyl groups such as 3,3,3-trifluoro-n-propyl, 1,1,2,2-tetrahydroperfluoro-n-hexyl, and 3-chloro-n-propyl. In some embodiments, at least 90 mole percent of the $X^1$ and $X^2$ groups are methyl. In some embodiments, at least at least 20 mole percent of the $X^1$ and $X^2$ groups are aryl, aralkyl, alkaryl, or combinations thereof; for example, the $X^1$ and $X^2$ groups may be phenyl.

In some embodiments, the cured silicon-containing resin comprises an organosiloxane (i.e., a silicone) having a chemical fragment —O—Si($X^1$)($X^2$)—$CH_2$-$CH_2$—Si($X^3$)($X^4$)—O—, wherein X1, $X^2$, and $X^4$ independently comprise an aliphatic group free of aliphatic unsaturation. Groups $X^1$ and $X^2$ are described above. Groups $X^3$ and $X^4$ can comprise any of the those described for $X^1$ and $X^2$.

The silicon-containing resins (first and/or second) used to form the cured silicone-containing resin are now described. In some embodiments, the silicon-containing resin comprises an organosiloxane (i.e., a silicone), which includes an organopolysiloxane. That is, the groups incorporating aliphatic unsaturation and silicon-bonded hydrogen may be bonded to the organosiloxane. In some embodiments, the silicon-containing resin comprises at least two organosiloxanes in which groups incorporating aliphatic unsaturation are part of one organosiloxane and groups incorporating silicon-bonded hydrogen are part of a second organosiloxane.

In some embodiments, the silicon-containing resin comprises a silicone component having at least two sites of aliphatic unsaturation (e.g., alkenyl or alkynyl groups) bonded to silicon atoms in a molecule and an organohydrogensilane and/or organohydrogenpolysiloxane component having at least two hydrogen atoms bonded to silicon atoms in a molecule. Preferably, a silicon-containing resin includes both components, with the silicone-containing aliphatic unsaturation as the base polymer (i.e., the major organosiloxane component in the composition.)

In some embodiments, the silicon-containing resin comprises an organopolysiloxane that contains aliphatic unsaturation and is preferably a linear, cyclic, or branched organopolysiloxane. The silicon-containing resin may comprise an organosiloxane having units of the formula $R^1_aR^2_b$$SiO_{(4-a-b)/2}$ wherein: $R^1$ is a monovalent, straight-chained, branched or cyclic, unsubstituted or substituted hydrocarbon group that is free of aliphatic unsaturation and has from 1 to 18 carbon atoms; $R^2$ is a monovalent hydrocarbon group having aliphatic unsaturation and from 2 to 10 carbon atoms; a is 0, 1, 2, or 3; b is 0, 1, 2, or 3; and the sum a+b is 0, 1, 2, or 3; with the proviso that there is on average at least one $R^2$ present per molecule. Organopolysiloxanes that contain aliphatic unsaturation preferably have an average viscosity of at least 5 mPa·s at 25° C.

Examples of suitable $R^1$ groups are alkyl groups such as methyl, ethyl, n-propyl, iso-propyl, n-butyl, iso-butyl, tert-butyl, n-pentyl, iso-pentyl, neo-pentyl, tert-pentyl, cyclopentyl, n-hexyl, cyclohexyl, n-octyl, 2,2,4-trimethylpentyl, n-decyl, n-dodecyl, and n-octadecyl; aromatic groups such as phenyl or naphthyl; alkaryl groups such as 4-tolyl; aralkyl groups such as benzyl, 1-phenylethyl, and 2-phenylethyl; and substituted alkyl groups such as 3,3,3-trifluoro-n-propyl, 1,1,2,2-tetrahydroperfluoro-n-hexyl, and 3-chloro-n-propyl. In some embodiments, at least 90 mole percent of the $R^1$ groups are methyl. In some embodiments, at least at least 20 mole percent of the $R^1$ groups are aryl, aralkyl, alkaryl, or combinations thereof; for example, the $R^1$ groups may be phenyl.

Examples of suitable $R^2$ groups are alkenyl groups such as vinyl, 5-hexenyl, 1-propenyl, allyl, 3-butenyl, 4-pentenyl, 7-octenyl, and 9-decenyl; and alkynyl groups such as ethynyl, propargyl and 1-propynyl. In some embodiments, the $R^2$ groups are vinyl or 5-hexenyl. Groups having aliphatic carbon-carbon multiple bonds include groups having cycloaliphatic carbon-carbon multiple bonds.

In some embodiments, the silicon-containing resin comprises an organopolysiloxane that contains silicon-bonded hydrogen and is preferably a linear, cyclic, or branched organopolysiloxane. The silicon-containing resin may comprise an organosiloxane having units of the formula $R^1_aH_cSiO_{(4-a-c)/2}$ wherein: $R^1$ is as defined above; a is 0, 1, 2, or 3; c is 0, 1, or 2; and the sum of a+c is 0, 1, 2, or 3; with the proviso that there is on average at least 1 silicon-bonded hydrogen atom present per molecule. Organopolysiloxanes that contain silicon-bonded hydrogen preferably have an average viscosity of at least 5 mPa·s at 25° C. In some embodiments, at least 90 mole percent of the $R^1$ groups are methyl. In some embodiments, at least at least 20 mole percent of the $R^1$ groups are aryl, aralkyl, alkaryl, or combinations thereof; for example, the $R^1$ groups may be phenyl.

In some embodiments, the silicon-containing resin comprises an organopolysiloxane that contains both aliphatic unsaturation and silicon-bonded hydrogen. Such organopolysiloxanes may comprise units of both formulae $R^1{}_aR^2{}_bSiO_{(4-a-b)/2}$ and $R^1{}_aH_cSiO_{(4-a-c)/2}$. In these formulae, $R^1$, $R^2$, a, b, and c are as defined above, with the proviso that there is an average of at least 1 group containing aliphatic unsaturation and 1 silicon-bonded hydrogen atom per molecule. In one embodiment, at least 90 mole percent of the $R^1$ groups are methyl. In some embodiments, at least at least 20 mole percent of the $R^1$ groups are aryl, aralkyl, alkaryl, or combinations thereof; for example, the $R^1$ groups may be phenyl.

The molar ratio of silicon-bonded hydrogen atoms to aliphatic unsaturation in the silicon-containing resin (particularly the organopolysiloxane resin) may range from 0.5 to 10.0 mol/mol, preferably from 0.8 to 4.0 mol/mol, and more preferably from 1.0 to 3.0 mol/mol.

For some embodiments, organopolysiloxane resins described above wherein a significant fraction of the $R^1$ groups are phenyl or other aryl, aralkyl, or alkaryl are preferred, because the incorporation of these groups provides materials having higher refractive indices than materials wherein all of the $R^1$ radicals are, for example, methyl.

One or more catalysts may be used to accelerate hydrosilylation. Useful catalysts include metal calalysts such as platinum catalysts. In some embodiments, the catalyst may be a platinum photocatalyst such as any of those disclosed in U.S. Pat. No 7,192,795 (Boardman et al.) and references cited therein. The platinum photocatalyst may be selected from the group consisting of Pt(II) β-diketonate complexes, ($\eta^5$-cyclopentadienyl)tri(σ-aliphatic)platinum complexes, $C_{1-20}$-aliphatic substituted ($\eta^5$-cyclopentadienyl)tri(σ-aliphatic)platinum complexes, and $C_{7-20}$-aromatic substituted ($\eta^5$-cyclopentadienyl)tri(σ-aliphatic)platinum complexes. In some embodiments, the catalyst may be a thermal platinum catalyst such as any of those disclosed in U.S. Pat. No. 2,823,218 (Speier et al); U.S. Pat. No. 3,419,593 (Willing); U.S. Pat. Nos. 3,715,334 and 3,814,730 (Karstedt); U.S. Pat. No. 4,421,903 (Ashby); U.S. Pat. No. 3,220,972 (Lamoreaux); U.S. Pat. No. 4,613,215 (Chandra et al); and U.S. Pat. No. 4,705,765 (Lewis). In some embodiments, the thermal platinum catalyst comprises a platinum vinylsiloxane complex.

The first and/or second compositions may comprise a platinum photocatalyst present in an amount of from about 0.5 to about 1000 parts of platinum per one million parts (ppm) of the curable or photopolymerizable layer. For this embodiment, the photopolymerizable layer can be free of catalyst inhibitor or include catalyst inhibitor at a stoichiometric amount less than that of the platinum photocatalyst. In some embodiments, the amount of platinum photocatalyst is from about 0.5 to about 500 ppm, from about 0.5 to 200 ppm, from about 0.5 to about 50 ppm, from about 0.5 to about 30 ppm or from about 10 to about 25 ppm.

Compositions comprising a platinum photocatalyst can be photopolymerized using actinic radiation having a wavelength of 700 nm or less. The actinic radiation activates the platinum photocatalyst. Actinic radiation having a wavelength of 700 nm or less includes visible and UV light, but preferably, the actinic radiation has a wavelength of 600 nm or less, and more preferably from 200 to 600 nm, and even more preferably, from 250 to 500 nm. Preferably, the actinic radiation has a wavelength of at least 200 nm, and more preferably at least 250 nm.

Photoinitiators can be used in the compositions to increase the overall rate of polymerization. Useful photoinitiators include those described in WO 2009/137220 (Thompson et al.).

Catalyst inhibitors can be used in the compositions in order to extend the usable shelf life of the composition, however, catalyst inhibitors may also slow down decrease cure speed. In some embodiments, a catalyst inhibitor may be used in an amount sufficient to extend the usable shelf life of the composition without having an undesirable affect on cure speed of the composition. In some embodiments, a composition comprises a catalyst inhibitor at a stoichiometric amount less than that of the platinum photocatalyst. Useful catalyst inhibitors include those described in WO 2009/137220 (Thompson et al.). In some embodiments, the composition contains less than a stoichiometric amount of inhibitor relative to the platinum catalyst. In some embodiments the composition contains no catalyst inhibitor.

The optical bonding layer is formed from first and second compositions, and either or both of these compositions can comprise a silicon-containing resin having silicon-bonded hydrogen and aliphatic unsaturation.

In general, the optical bonding layer may comprise spacer beads in order to "set" a particular thickness of the layer. The spacer beads may comprise ceramic, glass, silicate, polymer, or plastic. The spacer beads are generally spherical and have a diameter of from about 1 um to about 5 mm, from about 50 um to about 1 mm, or from about 50 um to about 0.2 mm.

In general, the optical bonding layer may comprise nonabsorbing metal oxide particles, for example, to modify the refractive index of the optical bonding layer. Nonabsorbing metal oxide particles that are substantially transparent may be used. For example, a 1 mm thick disk of the nonabsorbing metal oxide particles in an optical bonding layer may absorb less than about 15% of the light incident on the disk. Examples of nonabsorbing metal oxide particles include clay, $Al_2O_3$, $ZrO_2$, $TiO_2$, $V_2O_5$, ZnO, $SnO_2$, ZnS, $SiO_2$, and mixtures thereof, as well as other sufficiently transparent non-oxide ceramic materials. The metal oxide particles can be surface treated to improve dispersibility in the optical bonding layer and the composition from which the layer is coated. Examples of surface treatment chemistries include silanes, siloxanes, carboxylic acids, phosphonic acids, zirconates, titanates, and the like. Techniques for applying such surface treatment chemistries are known.

Nonabsorbing metal oxide particles may be used in an amount needed to produce the desired effect, for example, in an amount of from about 10 to about 85 wt. %, or from about 40 to about 85 wt. %, based on the total weight of the optical bonding layer. Nonabsorbing metal oxide particles may only be added to the extent that they do not add undesirable color, haze or transmission characteristics. Generally, the particles can have an average particle size of from about 1 nm to about 100 nm.

Each of the first composition, second composition and optical bonding layer can optionally include one or more additives such as chain transfer agents, antioxidants, stabilizers, fire retardants, viscosity modifying agents, antifoaming agents, antistats, wetting agents, colorants such as dyes and pigments, fluorescent dyes and pigments, phosphorescent dyes and pigments, fibrous reinforcing agents, and woven and non-woven fabrics.

Optical Bonding With Silicon-Containing Resins

Method A

In some embodiments, the optical bonding layer may be formed using Method A wherein the first and second compositions are dispensed on the first major surface (in contact with the first major surface) of the first optical substrate, followed by contacting the second major surface of the second optical substrate with the first and/or second compositions. FIGS. 2a-2b are examples of this method. More specifically, Method A comprises: providing first and second optical substrates; providing a first composition; providing a second composition; dispensing the first composition on a first major surface of the first optical substrate; dispensing the second composition on the first major surface; contacting a second major surface of the second optical substrate with the first and/or second compositions dispensed on the first major surface, such that a curable layer comprising the first and second compositions is formed between the first and second major surfaces; and curing the curable layer to form an optical bonding layer, wherein the optical bonding layer comprises first and second regions having different physical properties.

The first composition may comprise a first silicon-containing resin comprising silicon-bonded hydrogen and aliphatic unsaturation present in a first molar ratio of from 0.01 to 2; and the second composition may comprise a second silicon-containing resin comprising silicon-bonded hydrogen and aliphatic unsaturation present in a second molar ratio of from 2 to 100, wherein the first and/or second compositions comprise a metal catalyst. The first molar ratio can be less than that of the second. The first molar ratio can be from 0.1 to 1; and the second molar ratio can be from 2 to 10. The second silicon-containing resin can comprise: molecules or oligomers having at least three silicon-bonded hydrogens per molecule or oligomer, or molecules or oligomers having at least three aliphatic unsaturation sites per molecule or oligomer. The first and second regions can be formed at different rates. At least one of the first and second regions can have a viscosity. At least one of the first and second regions can comprise a gel or an elastomer. The different physical properties can comprise different moduli or different tack. The second composition can be dispensed on the second major surface of the second optical substrate before the curable layer is formed. The second composition can be dispensed on the first major surface such that it substantially surrounds the first composition. The second region can substantially surround the first region. The second composition can be dispensed on the first major surface such that it substantially surrounds the first composition, and the first region can be tacky, and the second not tacky. The second composition can be dispensed on the first major surface such that it substantially surrounds the first composition, wherein the viscosity of the second composition can be less than ten times the viscosity of the first composition, or equal to or less than the viscosity of the first composition. The metal catalyst can comprise a platinum photocatalyst. The first and second compositions can comprise a platinum photocatalyst. The second region can substantially surround the first region, wherein the first region is formed from a first composition comprising a platinum photocatalyst, and a second composition that does not. The first and/or second compositions can comprise a catalyst inhibitor at a stoichiometric amount less than that of the platinum photocatalyst.

The first composition may comprise a first silicon-containing resin comprising silicon-bonded hydrogen and aliphatic unsaturation present in a first molar ratio of from 0.01 to 2; and the second composition may comprise a second silicon-containing resin comprising silicon-bonded hydrogen and no aliphatic unsaturation, wherein the first and/or second compositions comprise a metal catalyst. The first molar ration can be from 0.1 to 1. The second silicon-containing resin can comprise molecules or oligomers having at least three silicon-bonded hydrogens per molecule or oligomer. The first and second regions can be formed at different rates. At least one of the first and second regions can have a viscosity. At least one of the first and second regions can comprises a gel or an elastomer. The different physical properties can comprise different moduli or different tack. The second composition can be dispensed on both the first and second major surfaces prior to forming the curable layer. The second composition can be dispensed on the second major surface of the second optical substrate before the curable layer is formed. The second composition can be dispensed on the first major surface such that it substantially surrounds the first composition. The second region can substantially surround the first region. The second composition can be dispensed on the first major surface such that it substantially surrounds the first composition, and the first region can be tacky, and the second not tacky. The second composition can be dispensed on the first major surface such that it substantially surrounds the first composition, wherein the viscosity of the second composition can be less than ten times the viscosity of the first composition, or equal to or less than the viscosity of the first composition. The metal catalyst can comprise a platinum photocatalyst. The first and second compositions can comprise a platinum photocatalyst. The second region can substantially surround the first region, wherein the first region is formed from a first composition comprising a platinum photocatalyst, and a second composition that does not. The second region can substantially surround the first region, wherein the first region is formed from a first composition comprising a platinum photocatalyst, and a second composition comprising a platinum thermal catalyst but not a platinum photocatalyst. The second region can substantially surround the first region, wherein the first region is formed from a first composition comprising a platinum photocatalyst, and a second composition comprising a platinum thermal catalyst but not a platinum photocatalyst and not a platinum catalyst inhibitor. The first and/or second compositions can comprise a catalyst inhibitor at a stoichiometric amount less than that of the platinum photocatalyst.

The first composition may comprise a first resin comprising aliphatic unsaturation and no silicon-bonded hydrogen, and the second composition may comprise a second silicon-containing resin comprising silicon-bonded hydrogen and aliphatic unsaturation present in a second molar ratio of from 2 to 100, wherein the first and/or second compositions comprise a metal catalyst. The second silicon-containing resin can comprise molecules or oligomers having at least three silicon-bonded hydrogens per molecule or oligomer, or molecules or oligomers having at least three aliphatic unsaturation sites per molecule or oligomer. The first and second regions can be formed at different rates. At least one of the first and second regions has a viscosity. The second region can comprise an elastomer. The different physical properties can comprise different moduli or different tack. The second composition can be dispensed on the second major surface of the second optical substrate before the curable layer is formed. The second composition can be dispensed on the first major surface such that it substantially surrounds the first composition. The second region can substantially surround the first region. The second composition can be dispensed on the first major surface such that it substantially surrounds the first composition, and the first region can be tacky, and the second not tacky. The second composition can be dispensed on the first major surface such that it substantially surrounds the first composition, wherein the viscosity of the second composition can be less than ten times the viscosity of the first composition, or equal to or less than the viscosity of the first composition.

The first composition may comprise a first silicon-containing resin comprising silicone-bonded hydrogen and no aliphatic unsaturation; and the second composition may comprise a second silicon-containing resin comprising aliphatic unsaturation and silicon-bonded hydrogen present in a second molar ratio of from 2 to 100, wherein the first and/or second compositions comprise a metal catalyst. The second molar ratio can be from 2 to 10. The second silicon-containing resin can comprise molecules or oligomers having at least three silicon-bonded hydrogens per molecule or oligomer, or molecules or oligomers having at least three aliphatic unsaturation sites per molecule or oligomer. At least one of the first and second regions can have a viscosity or comprise an elastomer. The different physical properties can comprise different moduli or different tack. The second composition can be dispensed on the first major surface such that it substantially surrounds the first composition, and optionally, such that the second region substantially surrounds the first region. In these cases, the first region can be tacky, and the second not tacky. Also in these cases, the viscosity of the second composition can be less than ten times the viscosity of the first composition, or equal to or less than the viscosity of the first composition. The second composition can be dispensed on the second major surface of the second optical substrate before the curable layer is formed.

The first composition can comprise a first resin comprising aliphatic unsaturation and no silicon-bonded hydrogen, and the second composition can comprise a second silicon-containing resin comprising silicon-bonded hydrogen and no aliphatic unsaturation, wherein the first and/or second compositions comprise a metal catalyst. The second silicon-containing resin can comprise molecules or oligomers having at least three silicon-bonded hydrogens per molecule or oligomer. At least one of the first and second regions can have a viscosity. The second composition can be dispensed on the first major surface such that it substantially surrounds the first composition, and optionally, such that the second region substantially surrounds the first region. In these cases, the first region can be tacky, and the second not tacky. Also in these cases, the viscosity of the second composition can be less than ten times the viscosity of the first composition, or equal to or less than the viscosity of the first composition. The second composition can be dispensed on the second major surface of the second optical substrate before the curable layer is formed.

The first composition can comprise a first silicon-containing resin comprising silicon-bonded hydrogen and no aliphatic unsaturation, and the second composition can comprise a second resin comprising aliphatic unsaturation and no silicon-bonded hydrogen, wherein the first and/or second compositions comprise a metal catalyst. The second resin can comprise molecules or oligomers having at least three aliphatic unsaturation sites per molecule or oligomer. At least one of the first and second regions can have a viscosity. The second composition can be dispensed on the first major surface such that it substantially surrounds the first composition, and optionally, such that the second region substantially surrounds the first region. In these cases, the first region can be tacky, and the second not tacky. Also in these cases, the viscosity of the second composition can be less than ten times the viscosity of the first composition, or equal to or less than the viscosity of the first composition. The second composition can be dispensed on the second major surface of the second optical substrate before the curable layer is formed.

Method B

In some embodiments, the optical bonding layer may be formed using Method B wherein the first composition is dispensed on the first major surface, and the second composition is dispensed on the first composition. FIGS. 3a-3c are examples of this method. More specifically, Method B comprises: providing first and second optical substrates; providing first and second compositions; dispensing the first composition on a first major surface of the first optical substrate; dispensing the second composition on the first composition; contacting a second major surface of the second optical substrate with the first and/or second compositions dispensed on the first major surface, such that a curable layer comprising the first and second compositions is formed between the first and second major surfaces; and curing the curable layer to form an optical bonding layer, wherein the optical bonding layer comprises first and second regions having different physical properties.

The first composition can comprise a first silicon-containing resin comprising silicon-bonded hydrogen and aliphatic unsaturation present in a first molar ratio of from 0.01 to 2, and the second composition can comprise a second silicon-containing resin comprising silicon-bonded hydrogen and aliphatic unsaturation present in a second molar ratio of from 2 to 100, wherein the first and/or second compositions comprise a metal catalyst. The first molar ratio can be less than that of the second. The first molar ratio can be from 0.1 to 1, and the second molar ratio from 2 to 10. The second silicon-containing resin can comprise molecules or oligomers having at least three silicon-bonded hydrogens per molecule or oligomer, or molecules or oligomers having at least three aliphatic unsaturation sites per molecule or oligomer. The second composition can be dispensed on the first composition such that it is substantially surrounded by the first composition. The second composition can be dispensed on at least two areas of the first composition such that the second composition is substantially surrounded by the first composition. The second composition can be dispensed on the first composition such that a portion of the second composition is substantially surrounded by the first composition, and another portion of the second composition is not substantially surrounded by the first compositions. The second composition can be dispensed on the first composition such that neither composition substantially surrounds the other. The first and second regions can be formed at different rates. At least one of the first and second regions can have a viscosity, comprise a gel, or comprise an elastomer. The different physical properties can comprise different moduli or different tack. The first region can be tacky, and the second not tacky.

The first composition can comprise a first silicon-containing resin comprising silicon-bonded hydrogen and aliphatic unsaturation present in a first molar ratio of from 0.01 to 2, and the second composition can comprise a second silicon-containing resin comprising silicon-bonded hydrogen and no aliphatic unsaturation, wherein the first and/or second compositions comprise a metal catalyst. The first molar ratio can be from 0.1 to 1. The second silicon-containing resin can comprise molecules or oligomers having at least three silicon-bonded hydrogens per molecule or oligomer. The second composition can be dispensed on the first composition such that it is substantially surrounded by the first composition. The second composition can be dispensed on at least two areas of the first composition such that the second composition is substantially surrounded by the first composition. The second composition can be dispensed on the first composition such that a portion of the second composition is substantially surrounded by the first composition, and another portion of the second composition is not substantially surrounded by the first composition. The second composition can be dispensed on the first composition such that neither composition substantially surrounds the other. The first and second regions can be formed at different rates. At least one of the first and second regions can comprise a gel or an elastomer. The different physical properties can comprise different moduli or different tack. The first region can be tacky, and the second not tacky.

The first composition can comprise a first resin comprising aliphatic unsaturation and no silicon-bonded hydrogen, and the second composition can comprise a second silicon-containing resin comprising silicon-bonded hydrogen and aliphatic unsaturation present in a second molar ratio of 2 to 100, wherein the first and/or second compositions comprise a metal catalyst. The second molar ratio can be from 2 to 10. The second silicon-containing resin can comprise molecules or oligomers having at least three silicon-bonded hydrogens per molecule or oligomer. The second composition can be dispensed on the first composition such that it is substantially surrounded by the first composition. The second composition can be dispensed on at least two areas of the first composition such that the second composition is substantially surrounded by the first composition. The second composition can be dispensed on the first composition such that a portion of the second composition is substantially surrounded by the first composition, and another portion of the second composition is not substantially surrounded by the first composition. The second composition can be dispensed on the first composition such that neither composition substantially surrounds the other. At least one of the first and second regions comprises an elastomer. The different physical properties can comprise different tack. The first region can be a liquid.

In some embodiments, Method B may comprise: providing first and second optical substrates; providing first and second compositions; dispensing the first composition on a first major surface of the first optical substrate; dispensing the second composition on the first composition; contacting a second major surface of the second optical substrate with the first and/or second compositions dispensed on the first major surface, such that a first curable layer comprising the first and second compositions is formed between the first and second major surfaces; forming a second curable layer by applying the second composition between the first and second major surfaces after the first curable layer is formed; curing the second curable layer to form an optical bonding layer, wherein the optical bonding layer comprises first and second regions having different physical properties.

The first composition may comprise a first resin comprising aliphatic unsaturation and no silicon-bonded hydrogen, and the second composition may comprise a second silicon-containing resin comprising silicon-bonded hydrogen and aliphatic unsaturation present in a second molar ratio of 2 to 100, wherein the first and/or second compositions comprise a metal catalyst.

The first composition may comprise a first silicon-containing resin comprising silicon-bonded hydrogen and no aliphatic unsaturation, and the second composition may comprise a second silicon-containing resin comprising aliphatic unsaturation and silicon-bonded hydrogen present in a second molar ratio of 2 to 100, wherein the first and/or second compositions comprise a metal catalyst.

Method C

In some embodiments, the optical bonding layer may be formed using Method C wherein a layer of the first composition is formed between the substrates, then the second composition is applied between the substrates. FIGS. 4a-4c are examples of this method. More specifically, Method C comprises: providing first and second optical substrates; providing first and second compositions; dispensing the first composition on a first major surface of the first optical substrate; contacting a second major surface of the second optical substrate with the first composition on the first major substrate such that a layer of the first composition is formed between the first and second major surfaces; forming a curable layer by applying the second composition between the first and second major surfaces after the layer of the first composition is formed; curing the curable layer to form an optical bonding layer, wherein the optical bonding layer comprises first and second regions having different physical properties.

The first composition can comprise a first silicon-containing resin comprising silicon-bonded hydrogen and aliphatic unsaturation present in a first molar ratio of 0.01 to 2, wherein the first composition comprises a metal catalyst; and the second composition can comprise a second silicon-containing resin comprising aliphatic unsaturation and silicon-bonded hydrogen present in a second molar ratio of 2 to 100, wherein the second composition optionally comprises a metal catalyst. The first molar ratio can be less than that of the second. The first molar ratio can be from 0.1 to 1, and the second molar ratio from 2 to 10. The second silicon-containing resin can comprise molecules or oligomers having at least three silicon-bonded hydrogens per molecule or oligomer, or molecules or oligomers having at least three aliphatic unsaturation sites per molecule or oligomer. The first composition can be at least partially cured before applying the second composition. The first region can comprise a gel. The second region can comprise an elastomer. The different physical properties can comprise different moduli or different tack. The viscosity of the second composition can be less than ten times the viscosity of the first composition, or equal to or less than the viscosity of the first composition. The second region can substantially surround the first region. In this case, the first region can be tacky, and the second not tacky. Also in this case, the first region can comprise a gel. Also in this case, the second region can comprise an elastomer.

The first composition can comprise a first silicon-containing resin comprising silicon-bonded hydrogen and aliphatic unsaturation present in a first molar ratio of 0.01 to 2, wherein the first composition comprises a metal catalyst; and the second composition can comprise a second silicon-containing resin comprising silicon-bonded hydrogen and no aliphatic unsaturation, wherein the second composition optionally comprises a metal catalyst. The first molar ratio can be from 0.1 to 1. The second silicon-containing resin can comprise molecules or oligomers having at least three silicon-bonded hydrogens per molecule or oligomer. The second region can substantially surround the first region. The first composition can be at least partially cured before applying the second composition. The first region can comprise a gel. The second region can comprise an elastomer. The different physical properties can comprise different moduli or different tack. The second region can substantially surround the first region and the first region is tacky, and the second is not. The viscosity of the second composition can be less than ten times the viscosity of the first composition, or equal to or less than the viscosity of the first composition. The second region can substantially surround the first region,-and the first region comprises a gel. The second region can substantially surround the first region, and the second region comprises an elastomer.

The first composition can comprising a first resin comprising aliphatic unsaturation and no silicon-bonded hydrogen, wherein the first composition optionally comprises a metal catalyst; and the second composition can comprise a second silicon-containing resin comprising silicon-bonded hydrogen and aliphatic unsaturation present in a second molar ratio of 2 to 100, wherein the second composition comprises a metal catalyst. The second molar ratio can be from 2 to 10. The second silicon-containing resin can comprise molecules or oligomers having at least three silicon-bonded hydrogens per molecule or oligomer. The second region can substantially surround the first region. The second region can comprise an elastomer. The different physical properties can comprise different moduli or different tack. The second region can substantially surround the first region and the first region is liquid, and the second is solid and is not tacky. The viscosity of the second composition can be less than ten times the viscosity of the first composition, or equal to or less than the viscosity of the first composition. The second region can substantially surround the first region, and the second region comprises an elastomer.

The first composition can comprise a first silicone containing resin comprising silicon-bonded hydrogen and no aliphatic unsaturation, wherein the first composition optionally comprises a metal catalyst; and the second composition can comprise a second silicon-containing resin comprising aliphatic unsaturation and silicon-bonded hydrogen present in a molar ratio of 2 to 100, wherein the second composition comprises a metal catalyst. The second molar ratio can be from 2 to 10. The second silicon-containing resin can comprise molecules or oligomers having at least three silicon-bonded hydrogens per molecule or oligomer. The second region can substantially surround the first region. The second region can comprise an elastomer. The different physical properties can comprise different moduli or different tack. The second region can substantially surround the first region and the first region is liquid, and the second is solid and not tacky. The viscosity of the second composition can be less than ten times the viscosity of the first composition, or equal to or less than the viscosity of the first composition.

The first composition can comprise a first resin comprising aliphatic unsaturation and no silicon-bonded hydrogen, wherein the first composition optionally comprises a metal catalyst, and the second composition can comprise a second silicon-containing resin comprising silicon-bonded hydrogen and no aliphatic unsaturation, wherein the second composition optionally comprises a metal catalyst. The second silicon-containing resin can comprise molecules or oligomers having at least three silicon-bonded hydrogens per molecule or oligomer. The second region can substantially surround the first region. The second region can comprise an elastomer. The second region can substantially surround the first region and the first region is liquid, and the second is solid and not tacky. The viscosity of the second composition can be less than ten times the viscosity of the first composition, or equal to or less than the viscosity of the first composition. The second region can substantially surround the first region, and the second region comprises an elastomer.

The first composition can comprise a first silicone containing resin comprising silicon-bonded hydrogen and no aliphatic unsaturation, wherein the first composition optionally comprises a metal catalyst; and the second composition can comprise a second resin comprising aliphatic unsaturation and no silicon-bonded hydrogen, wherein the second composition comprises a metal catalyst. The second resin can comprise molecules or oligomers having at least three aliphatic unsaturation sites per molecule or oligomer. The second region can substantially surround the first region. The second region can comprise an elastomer. The second region can substantially surround the first region and the first region is liquid, and the second is solid and not tacky. The viscosity of the second composition can be less than ten times the viscosity of the first composition, or equal to or less than the viscosity of the first composition. The second region can substantially surround the first region, and the second region comprises an elastomer.

Method D

In some embodiments, the optical bonding layer may be formed using Method D wherein each of the first and second compositions are applied on the first and second major surfaces, respectively, and then bringing then two substrates together. More specifically, Method D comprises: providing first and second optical substrates; providing first and second compositions; dispensing the first composition on a first major surface of the first optical substrate; dispensing the second composition on a second major surface of the second substrate; bringing the first and second optical substrates in proximity to each other such that a curable layer comprising the first and second compositions is formed between the first and second major surfaces; and curing the curable layer to form an optical bonding layer, wherein the optical bonding layer comprises first and second regions having different physical properties.

The first composition can comprise a first silicon-containing resin comprising silicon-bonded hydrogen and aliphatic unsaturation present in a first molar ratio of from 0.01 to 2, and the second composition can comprise a second silicon-containing resin comprising silicon-bonded hydrogen and aliphatic unsaturation present in a second molar ratio of from 2 to 100, wherein the first and/or second compositions comprise a metal catalyst. The first molar ratio can be less than that of the second. The first molar ratio can be from 0.1 to 1, and the second molar ratio from 2 to 10. The second silicon-containing resin can comprise molecules or oligomers having at least three silicon-bonded hydrogens per molecule or oligomer, or molecules or oligomers having at least three aliphatic unsaturation sites per molecule or oligomer. The first and second regions can be formed at different rates. At least one of the first and second regions can have a viscosity. At least one of the first and second regions can comprise a gel or an elastomer. The different physical properties can comprise different moduli or different tack. The second composition can be dispensed on the first major surface of the first optical substrate before the curable layer is formed. The second region can substantially surround the first region. The second region can substantially surround the first region wherein the first region is tacky, and the second is not tacky. The second region can substantially surround the first region, wherein the viscosity of the second composition can be less than ten times the viscosity of the first composition, or equal to or less than the viscosity of the first composition.

The first composition can comprise a first silicon-containing resin comprising silicon-bonded hydrogen and aliphatic unsaturation present in a first molar ratio of from 0.01 to 2; and the second composition can comprise a second silicon-containing resin comprising silicon-bonded hydrogen and no aliphatic unsaturation, wherein the first and/or second compositions comprise a metal catalyst. The first molar ratio can be from 0.1 to 1. The second silicon-containing resin can comprise molecules or oligomers having at least three silicon-bonded hydrogens per molecule or oligomer. The first and second regions can be formed at different rates. At least one of the first and second regions can have a viscosity. At least one of the first and second regions can comprise a gel or an elastomer. The different physical properties can comprise different moduli or different tack. The second composition can be dispensed on the first major surface of the first optical substrate before the curable layer is formed. The second region can substantially surround the first region. The second region can substantially surround the first region wherein the first region is tacky, and the second is not tacky. The second region can substantially surround the first region, wherein the viscosity of the second composition can be less than ten times the viscosity of the first composition, or equal to or less than the viscosity of the first composition.

The first composition can comprise a first resin comprising aliphatic unsaturation and no silicon-bonded hydrogen; and the second composition can comprise a second silicon-containing resin comprising silicon-bonded hydrogen and aliphatic unsaturation present in a molar ratio of 2 to 100, wherein the first and/or second compositions comprise a metal catalyst. The second molar ratio can be from 2 to 10. The second silicon-containing resin can comprise molecules or oligomers having at least three silicon-bonded hydrogens per molecule or oligomer, or molecules or oligomers having at least three aliphatic unsaturation sites per molecule or oligomer. The first and second regions can be formed at different rates. At least one of the first and second regions can have a viscosity. At least one of the first and second regions can comprise a gel or an elastomer. The different physical properties can comprise different moduli or different tack. The second composition can be dispensed on the first major surface of the first optical substrate before the curable layer is formed. The second composition can be dispensed on the first major surface such that it substantially surrounds the first composition. The second region can substantially surround the first region. The second region can substantially surround the first region, wherein the first region is tacky, and the second is not tacky. The second region can substantially surround the first region, wherein the viscosity of the second composition can be less than ten times the viscosity of the first composition, or equal to or less than the viscosity of the first composition.

The first composition can comprise a first silicon-containing resin comprising silicon-bonded hydrogen and no aliphatic unsaturation, and the second composition can comprise a second silicon-containing resin comprising aliphatic unsaturation and silicon-bonded hydrogen present in a molar ratio of 2 to 100, wherein the first and/or second compositions comprise a metal catalyst. The second molar ratio can be from 2 to 10. The second silicon-containing resin can comprise molecules or oligomers having at least three silicon-bonded hydrogens per molecule or oligomer, or molecules or oligomers having at least three aliphatic unsaturation sites per molecule or oligomer. The first and second regions can be formed at different rates. At least one of the first and second regions can have a viscosity. At least one of the first and second regions can comprise a gel or an elastomer. The different physical properties can comprise different moduli or different tack. The second composition can be dispensed on the first major surface of the first optical substrate before the curable layer is formed. The second composition can be dispensed on the first major surface such that it substantially surrounds the first composition. The second region can substantially surround the first region. The second region can substantially surround the first region wherein the first region is tacky, and the second is not tacky. The second region can substantially surround the first region, wherein the viscosity of the second composition can be less than ten times the viscosity of the first composition, or equal to or less than the viscosity of the first composition The first composition can comprise a first resin comprising aliphatic unsaturation and no silicon-bonded hydrogen, and the second composition can comprise a second silicon-containing resin comprising aliphatic silicon-bonded hydrogen and no aliphatic unsaturation, wherein the first and/or second compositions comprise a metal catalyst. The second silicon-containing resin can comprise molecules or oligomers having at least three silicon-bonded hydrogens per molecule or oligomer. At least one of the first and second regions can have a viscosity. The different physical properties can comprise different moduli or different tack. The second composition can be dispensed on the first major surface of the first optical substrate before the curable layer is formed. The second composition can be dispensed on the first major surface such that it substantially surrounds the first composition. The second region can substantially surround the first region. The second region can substantially surround the first region wherein the first region is tacky, and the second is not tacky. The second region can substantially surround the first region, wherein the viscosity of the second composition can be less than ten times the viscosity of the first composition, or equal to or less than the viscosity of the first composition.

The first composition can comprise a first silicon-containing resin comprising silicon-bonded hydrogen and no aliphatic unsaturation, and the second composition can comprise a second resin comprising aliphatic unsaturation and no silicon-bonded hydrogen, wherein the first and/or second compositions comprise a metal catalyst. The second resin can comprise molecules or oligomers having at least three aliphatic unsaturated sites per molecule or oligomer. At least one of the first and second regions can have a viscosity. The different physical properties can comprise different moduli or different tack. The second composition can be dispensed on the first major surface of the first optical substrate before the curable layer is formed. The second composition can be dispensed on the first major surface such that it substantially surrounds the first composition. The second region can substantially surround the first region. The second region can substantially surround the first region wherein the first region is tacky, and the second is not tacky. The second region can substantially surround the first region, wherein the viscosity of the second composition can be less than ten times the viscosity of the first composition, or equal to or less than the viscosity of the first composition.

Additional Methods

The method of optical bonding may comprise: providing first and second optical substrates; providing a first composition comprising a first silicon-containing resin, the first silicon-containing resin comprising silicon-bonded hydrogen and aliphatic unsaturation present in a first molar ratio of from 0.01 to 2; providing a second composition comprising a second silicon-containing resin, the second silicon-containing resin comprising silicon-bonded hydrogen and aliphatic unsaturation present in a second molar ratio of from 2 to 100, wherein the first and/or second compositions comprise a platinum photocatalyst; dispensing the first composition on a first major surface of the first optical substrate; dispensing the second composition on the first major surface; applying a sufficient amount of actinic radiation having a wavelength of 700 nm or less to activate the platinum photocatalyst, but not enough to cure the first and second compositions; contacting a second major surface of the second optical substrate with the first and/or second compositions dispensed on the first major surface, such that a curable layer comprising the first and second compositions is formed between the first and second major surfaces; and curing the curable layer to form an optical bonding layer, wherein the optical bonding layer comprises first and second regions having different physical properties. The first molar ratio can be less than that of the second. The first molar ratio can be from 0.1 to 1; and the second molar ratio can be from 2 to 10. The second silicon-containing resin can comprise molecules or oligomers having at least three silicon-bonded hydrogens per molecule or oligomer, or molecules or oligomers having at least three aliphatic unsaturation sites per molecule or oligomer. The first and second regions can be formed at different rates. At least one of the first and second regions can have a viscosity. At least one of the first and second regions can comprise a gel or an elastomer. The different physical properties can comprise different moduli or different tack. The second composition can be dispensed on the second major surface of the second optical substrate before the curable layer is formed. The second composition can be dispensed on the first major surface such that it substantially surrounds the first composition. The second region can substantially surround the first region. The second composition can be dispensed on the first major surface such that it substantially surrounds the first composition, and the first region can be tacky, and the second not tacky. The first and second compositions can comprise a platinum photocatalyst. The second region can substantially surround the first region, wherein the first region is formed from a first composition comprising a platinum photocatalyst, and a second composition that does not. The first and/or second compositions can comprise a catalyst inhibitor at a stoichiometric amount less than that of the platinum photocatalyst. Curing the curable layer can comprise applying heat in a range of 20 degrees Celsius to 80 degrees Celsius.

The method of optical bonding may comprise: providing first and second optical substrates; providing a first composition comprising a first silicon-containing resin, the first silicon-containing resin comprising silicon-bonded hydrogen and aliphatic unsaturation present in a first molar ratio of from 0.01 to 2; providing a second composition comprising a second silicon-containing resin, the second silicon-containing resin comprising silicon-bonded hydrogen and no aliphatic unsaturation, wherein the first and/or second compositions comprise a platinum photocatalyst; dispensing the first composition on a first major surface of the first optical substrate; dispensing the second composition on the first major surface; and applying a sufficient amount of actinic radiation having a wavelength of 700 nm or less to activate the platinum photocatalyst, but not enough to cure the first and second compositions; contacting a second major surface of the second optical substrate with the first and/or second compositions dispensed on the first major surface, such that a curable layer comprising the first and second compositions is formed between the first and second major surfaces; and curing the curable layer to form an optical bonding layer, wherein the optical bonding layer comprises first and second regions having different physical properties. The first molar ration can be from 0.1 to 1. The second silicon-containing resin can comprise molecules or oligomers having at least three silicon-bonded hydrogens per molecule or oligomer. The first and second regions can be formed at different rates. At least one of the first and second regions can have a viscosity. At least one of the first and second regions can comprises a gel or an elastomer. The different physical properties can comprise different moduli or different tack. The second composition can be dispensed on the second major surface of the second optical substrate before the curable layer is formed. The second composition can be dispensed on the first major surface such that it substantially surrounds the first composition. The second region can substantially surround the first region. The second composition can be dispensed on the first major surface such that it substantially surrounds the first composition, and the first region can be tacky, and the second not tacky. The first and second compositions can comprise a platinum photocatalyst. The second region can substantially surround the first region, wherein the first region is formed from a first composition comprising a platinum photocatalyst, and a second composition that does not. The second region can substantially surround the first region, wherein the second composition comprises a platinum thermal catalyst. The first and/or second compositions can comprise a catalyst inhibitor at a stoichiometric amount less than that of the platinum photocatalyst. Curing the curable layer can comprise applying heat in a range of 20 degrees Celsius to 80 degrees Celsius.

General Preparation of Optical Assembly

In the assembly process, it is generally desirable to have a layer of liquid composition that is substantially uniform. The two components are held securely in place. If desired, uniform pressure may be applied across the top of the assembly. If desired, the thickness of the layer may be controlled by a gasket, standoffs, shims, and/or spacers used to hold the components at a fixed distance to each other. Masking may be required to protect components from overflow. Trapped pockets of air may be prevented or eliminated by vacuum or other means. Radiation may then be applied to form the optical bonding layer.

The display panel assembly may be prepared by creating an air gap or cell between the two components and then disposing the liquid composition into the cell. An example of this method is described in U.S. Pat. No. 6,361,389 B1 (Hogue et. al) and includes adhering together the components at the periphery edges so that a seal along the periphery creates the air gap or cell. Adhering may be carried out using any type of adhesive, e.g., a bond tape such as a double-sided pressure sensitive adhesive tape, a gasket, an RTV seal, etc., as long as the adhesive does not interfere with reworkability as described above. Then, the liquid composition is poured into the cell through an opening at a periphery edge. Alternatively, the liquid composition is injected into the cell maybe using some pressurized injection means such as a syringe. Another opening is required to allow air to escape as the cell is filled. Exhaust means such as vacuum may be used to facilitate the process. Actinic radiation may then be applied as described above to form the optical bonding layer.

The optical assembly may be prepared using an assembly fixture such as the one described in U.S. Pat. No. 5,867,241 (Sampica et al.) In this method, a fixture comprising a flat plate with pins pressed into the flat plate is provided. The pins are positioned in a predetermined configuration to produce a pin field which corresponds to the dimensions of the display panel and of the component to be attached to the display panel. The pins are arranged such that when the display panel and the other components are lowered down into the pin field, each of the four corners of the display panel and other components is held in place by the pins. The fixture aids assembly and alignment of the components of an display panel assembly with suitable control of alignment tolerances. Additional embodiments of this assembly method are described in Sampica et al. U.S. Pat. No. 6,388,724 B1 (Campbell, et. al) describes how standoffs, shims, and/or spacers may be used to hold components at a fixed distance to each other.

Optical Components

The display panel assembly disclosed herein may comprise additional components typically in the form of layers. For example, a heating source comprising a layer of indium tin oxide or another suitable material may be disposed on one of the components. Additional components are described in, for example, US 2008/0007675 A1 (Sanelle et al.).

The display panel may comprise any type of panel such as a liquid crystal display panel. Liquid crystal display panels are well known and typically comprise a liquid crystal material disposed between two substantially transparent substrates such as glass or polymer substrates. As used herein, substantially transparent refers to a substrate that is suitable for optical applications, e.g., has at least 85% transmission over the range of from 460 to 720 nm. Optical substrates may have, per millimeter thickness, a transmission of greater than about 85% at 460 nm, greater than about 90% at 530 nm, and greater than about 90% at 670 nm. On the inner surfaces of the substantially transparent substrates are transparent electrically conductive materials that function as electrodes. In some cases, on the outer surfaces of the substantially transparent substrates are polarizing films that pass essentially only one polarization state of light. When a voltage is applied selectively across the electrodes, the liquid crystal material reorients to modify the polarization state of light, such that an image is created. The liquid crystal display panel may also comprise a liquid crystal material disposed between a thin film transistor array panel having a plurality of thin film transistors arranged in a matrix pattern and a common electrode panel having a common electrode.

The display panel may comprise a plasma display panel. Plasma display panels are well known and typically comprise an inert mixture of noble gases such as neon and xenon disposed in tiny cells located between two glass panels. Control circuitry charges electrodes within the panel which causes the gases to ionize and form a plasma which then excites phosphors to emit light.

The display panel may comprise an organic electroluminescence panel. These panels are essentially a layer of an organic material disposed between two glass panels. The organic material may comprise an organic light emitting diode (OLED) or a polymer light emitting diode (PLED). These panels are well known.

The display panel may comprise an electrophoretic display. Electrophoretic displays are well known and are typically used in display technology referred to as electronic paper or e-paper. Electrophoretic displays comprise a liquid charged material disposed between two transparent electrode panels. Liquid charged material may comprise nanoparticles, dyes and charge agents suspended in a nonpolar hydrocarbon, or microcapsules filled with electrically charged particles suspended in a hydrocarbon material. The microcapsules may also be suspended in a layer of liquid polymer.

The substantially transparent substrate used in the display panel assembly may comprise a variety of types and materials. The substantially transparent substrate is suitable for optical applications and typically has at least 85% transmission over the range of from 460 to 720 nm. The substantially transparent substrate may have, per millimeter thickness, a transmission of greater than about 85% at 460 nm, greater than about 90% at 530 rim, and greater than about 90% at 670 nm.

The substantially transparent substrate may comprise glass or polymer. Useful glasses include borosilicate, sodalime, and other glasses suitable for use in display applications as protective covers. One particular glass that may be used comprises EAGLE XG™ and JADE™ glass substrates available from Coming Inc. Useful polymers include polyester films such as polyethylene terephalate, polycarbonate films or plates, acrylic films such as polymethylmethacrylate films, and cycloolefin polymer films such as ZEONOX and ZEONOR available from Zeon Chemicals L.P. The substantially transparent substrate preferably has an index of refraction close to that of display panel and/or the optical bonding layer; for example, from about 1.4 and about 1.7. The substantially transparent substrate typically has a thickness of from about 0.5 to about 5 mm.

The substantially transparent substrate may comprise a touch screen. Touch screens are well known and generally comprise a transparent conductive layer disposed between two substantially transparent substrates. For example, a touch screen may comprise indium tin oxide disposed between a glass substrate and a polymer substrate.

The optical assembly disclosed herein may be used in a variety of optical devices including, but not limited to, a phone, a television, a computer monitor, a projector, or a sign. The optical device may comprise a backlight for a display or lighting device.

EXAMPLES

| Table of Materials | |
|---|---|
| Chemical | Description |
| Catalyst | methylcyclopentadienyl(trimethyl)-platinum (IV) or MeCpPtMe$_3$ from Strem Chemical, Newburyport, MA |
| SYL-OFF 7678 | siloxane comprising methylhydrogen siloxane and dimethyl siloxane from Dow Corning, Midland, Michigan |
| DMS-V31 | vinyl-terminated polydimethylsiloxane from Gelest, Inc., Morrisville, PA |
| DMS-V52 | vinyl-terminated polydimethylsiloxane from Gelest, Inc., Morrisville, PA |
| PP2-D200 | Mixture of Parts A and B (unreacted): |
| Parts A and B without catalyst | >70 wt % dimethylvinyl-terminated dimethylsiloxane, <25% (methylhydrosiloxane)(dimethylsiloxane) copolymer, and from 0 to 5% vinyl modified Q silica resin; from Gelest, Inc., Morrisville, PA |

Preparative Example 1

Catalyst Solution

In a room lit only with filtered yellow light that has no wavelengths below 500 nm, a catalyst solution was prepared by dissolving 33 mg of MeCpPtMe$_3$ in 1 mL toluene.

Preparative Example 2

Crosslinking Solution

A crosslinking solution was prepared by mixing 0.714 grams of SYL-OFF 7678 with 20.00 grams of DMS-V31.

Preparative example 3

Photocurable Silicone Gel

In a room lit only with filtered yellow light that has no wavelengths below 500 nm, a silicone formulation was prepared that can be photocured to make a gel. To 100.00 grams of Part A was added 10.00 g of Part B. Then, 165.7 microliters of Preparative Example 1 was added. Finally, the resulting combination was thoroughly mixed and degassed under vacuum.

Preparative Example 4

Quick-Cure Anchoring Silicone

In a room lit only with filtered yellow light that has no wavelengths below 500 nm, 0.127 g of SYL-OFF 7678 and 30.0 microliters of Preparative Example 1 were added to 20.00 grams of DMS-V52. The resulting combination was thoroughly mixed and degassed under vacuum.

Example 1

A construction was assembled using two glass slides, a polarizer film, and an optical bonding silicone. A sheet of polarizing film (Nitto Denko, Japan) was laminated to a 2"×3" glass slide (VWR, West Chester, Pa.). This laminated glass slide ultimately became the bottom of the fully cured example construction.

Next, 0.65 g of Preparative Example 3 was dispensed on the top surface of the polarizer in the X-like shape shown in FIG. 2a. Then, 0.15 g of Preparative Example 2 was dispensed as dots as shown in FIG. 2a.

The dots of Preparative Example 2 were then spread with a cotton applicator tip to form a narrow band around the perimeter of the polarizer surface. This resulted in slightly less Preparative Example 2 in the portion of the band near the right edge compared to amounts near the other three edges. The assembly of glass slide/polarizer/dispensed liquids was placed on an RCT BASIC S1 Hot Plate (IKA Works, Inc Wilmington, N.C.) set at 65° C. and allowed to stand 3 minutes before the top glass slide was laminated to the silicone bonding layer. Lamination of the top glass slide was done by slowly lowering it onto the heated assembly from the left side to the right side causing the liquids to spread into a uniform bonding layer.

The assembly was cured by exposing it to a low intensity UV lamp, UVP Blak-Ray lamp Model XX-15L (VWR, West Chester, Pa.), at a distance of 4.5 cm from the bulbs to the surface of the sample, while simultaneously being heated at 65° C. The sample was allowed to cure for 15 minutes and was then removed from the hot plate. Inspection of the sample following curing found tacky, soft gel bonding the majority of the area of the top and bottom plates, with non-tacky, hardened gel around the edge.

Example 2

Photocurable silicone gel made according to Preparative Example 3 was dispensed with the X-like shape on a glass plate or glass plate laminated with polarizing film (Nitto Denko, Japan). Another glass cover sheet was carefully lowered onto the plate with dispensed silicone gel causing the dispensed liquid to spread evenly between the surfaces of both top and bottom plates. The assembly was cured by exposing it to 18 mW/cm$^2$ UV radiation for 10 minutes using a UV oven Model Xlite600 (OPAS, Taiwan). The exposure also caused the temperature to rise above room temperature, but less than 65° C. When the oven curing was completed, a small amount of SYL-OFF 7678 was brushed onto the exposed edge of the silicone gel between the two plates. The assembly was allowed to stand at room temperature for 30 minutes, causing the edges of the gel to harden.

Example 3

An assembly was prepared in a manner similar to Example 1 but using a different silicone bonding layer. Onto the surface of a polarizer film laminated to a glass slide was placed 0.65 g of photocurable silicone gel from Preparative Example 3 in the same X-like shape used in Example 1. Then 4 small dots of Preparative Example 4 totaling 0.02 g were dispensed onto the four corners of the top glass slide in the display sample construction. The assembly of glass slide/polarizer/dispensed liquids was placed on an RCT BASIC S1 Hot Plate (IKA Works, Inc Wilmington, N.C.) set at 65° C. and allowed to stand 3 minutes before the top glass slide was laminated to the silicone bonding layer. Lamination of the top glass slide was done by slowly lowering it with the four dots of Quick-curing Anchoring Silicone facing the polarizer surface onto the heated assembly from the left side of the above figure to the right side causing the liquids to spread into a uniform bonding layer. The assembly was cured by exposing it to a low intensity UV lamp, UVP Blak-Ray lamp Model XX-15L (VWR, West Chester, Pa.), at a distance of 4.5 cm from the bulbs to the surface of the sample, while simultaneously being heated at 65° C.

The sample was cured for 45 seconds. Following the 45 seconds of exposure to UV and heat, the sample was removed and held vertically. The silicone bonding layer had reached the gel point as evidenced by the fact that when only the laminated bottom glass slide was held, the top glass slide and silicone adhesive layer did not travel downward under gravitational force.

The sample was then transported to another 65° C. hot plate to finish curing for 15 minutes without additional exposure to UV light. Following this curing schedule, crosslinker was applied to the edge in a manner equivalent to Example 2 causing the edges to harden and become non-tacky.

A number of embodiments of the invention have been described and it is to be understood that various modifications may be made without departing from the spirit and scope of the invention. Accordingly, other embodiments are within the scope of the following claims.

What is claimed is:

1. A display panel assembly comprising:
   a display panel;
   a substantially transparent optical substrate; and
   a cured optical bonding layer prepared from a curable layer, wherein the curable layer consists essentially of a curable composition, wherein the curable composition comprises first and second compositions that are individually curable, and disposed between and filling the gap between the display panel and the substantially transparent optical substrate, the optical bonding layer comprising a first region comprising the first curable composition and a second region substantially surrounding the first region, wherein the second region comprises the second curable composition that is cured by hydrosilylation of a first silicon-containing resin comprising aliphatic unsaturation and a second silicon-containing resin comprising silicon-bonded hydrogen, and the hardness of the second region is greater than that of the first.

2. A display panel assembly of claim 1, wherein the first region is tacky, and the second is not.

3. The display panel assembly of claim 1, wherein the second cured silicon-containing resin comprises an organosiloxane.

* * * * *